(12) United States Patent
Zheng et al.

(10) Patent No.: US 10,790,678 B2
(45) Date of Patent: Sep. 29, 2020

(54) METHOD AND SYSTEM FOR BALANCING A BATTERY ASSEMBLY

(71) Applicant: SZ DJI TECHNOLOGY CO., LTD., Shenzhen (CN)

(72) Inventors: Dayang Zheng, Shenzhen (CN); Lei Wang, Shenzhen (CN); Wentao Wang, Shenzhen (CN); Juncheng Zhan, Shenzhen (CN); Bogao Xu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 135 days.

(21) Appl. No.: 15/433,591

(22) Filed: Feb. 15, 2017

(65) Prior Publication Data
US 2017/0163060 A1 Jun. 8, 2017

Related U.S. Application Data

(63) Continuation of application No. PCT/CN2015/100213, filed on Dec. 31, 2015.

(51) Int. Cl.
*H02J 7/00* (2006.01)
*H01M 10/44* (2006.01)

(52) U.S. Cl.
CPC .......... *H02J 7/0019* (2013.01); *H02J 7/0014* (2013.01); *H01M 10/441* (2013.01)

(58) Field of Classification Search
CPC ...... H02J 7/0019; H02J 7/0021; H02J 7/0014; H02J 7/0016
(Continued)

(56) References Cited

U.S. PATENT DOCUMENTS

2010/0237830 A1* 9/2010 Castelaz ............... H02J 7/0019
320/118
2010/0244781 A1* 9/2010 Kramer ................. H02J 7/0016
320/162
(Continued)

FOREIGN PATENT DOCUMENTS

CN 201985568 U 9/2011
CN 102255361 A 11/2011
(Continued)

OTHER PUBLICATIONS

The World Intellectual Property Organization (WIPO) International Search Report and Written Opinion for PCT/CN2015/100213 dated Sep. 29, 2016 10 Pages.

*Primary Examiner* — Richard Isla
*Assistant Examiner* — Johali A Torres Ruiz
(74) *Attorney, Agent, or Firm* — Anova Law Group, PLLC

(57) ABSTRACT

A system for balancing a battery assembly and related methods for making and using same are provided. The system can obtain a status of a battery assembly with a plurality of batteries. One or more of the batteries can be selected based on the obtained status, and the selected batteries can be balanced. The system, for example, can control active balancing of the selected batteries when the battery assembly is in a static state and control selective discharging of the selected batteries when the battery assembly is in a discharging state. When the battery assembly is in a charging state, selective charging of the selected batteries can be controlled. One or more cells that comprise the individual batteries alternatively can be selected for balancing. A protective circuit can help ensure safety of the balancing. Battery balancing can be energy-efficient and
(Continued)

time-efficient. The lifetime of the battery assembly can be extended.

17 Claims, 19 Drawing Sheets

(58) Field of Classification Search
USPC .......................................................... 320/103
See application file for complete search history.

(56) References Cited

U.S. PATENT DOCUMENTS

| | | | | |
|---|---|---|---|---|
| 2011/0248677 | A1* | 10/2011 | Shimizu | ................ H02J 7/0016 320/118 |
| 2012/0274283 | A1* | 11/2012 | van Lammeren | ... H01M 10/441 320/118 |
| 2012/0293129 | A1 | 11/2012 | Naghshtabrizi | |
| 2013/0026989 | A1* | 1/2013 | Gibbs | ................. H01M 10/441 320/116 |
| 2013/0062946 | A1* | 3/2013 | Ferber, Jr. | ............. H02J 7/0014 307/43 |
| 2016/0043578 | A1* | 2/2016 | Miyamoto | ............ H02J 7/0016 320/118 |
| 2016/0064968 | A1* | 3/2016 | Lee | ....................... H02J 7/0016 320/118 |
| 2016/0308375 | A1* | 10/2016 | Pognant-Gros | ....... H02J 7/0016 |

FOREIGN PATENT DOCUMENTS

| | | |
|---|---|---|
| CN | 102324764 A | 1/2012 |
| CN | 103117577 A | 5/2013 |
| CN | 103441542 A | 12/2013 |
| CN | 103545871 A | 1/2014 |
| CN | 103682483 A | 3/2014 |
| CN | 204145029 U | 2/2015 |
| JP | 2010119244 A | 5/2010 |
| WO | 2012040496 A1 | 3/2012 |

* cited by examiner

METHOD AND SYSTEM FOR BALANCING A BATTERY ASSEMBLY

CROSS-REFERENCE TO RELATED APPLICATION

This is a continuation application of International Application. No. PCT/CN2015/100213 filed on Dec. 31, 2015, the entire contents of which are incorporated herein by reference.

COPYRIGHT NOTICE

A portion of the disclosure of this patent document contains material which is subject to copyright protection. The copyright, owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to battery technology and more particularly, but not exclusively, to methods and systems for balancing a battery assembly.

BACKGROUND

A battery is a device that can be used for powering a wide variety of common systems, ranging from hearing aids and wristwatches to cars and computer data centers. A battery typically includes multiple cells. Each cell converts stored chemical energy into electrical energy to deliver desired voltage, current, capacity, or power density.

Rechargeable batteries can be repeatedly charged and discharged. After numerous recharge cycles, differences in the cells in capacities, temperatures, internal chemical characteristics, internal resistance, and degradation can cause cell imbalance. The cell imbalance can result in a divergence in voltage among cells over time. Imbalanced cells can cause overcharging and over-discharging damage to the cells and thereby decrease the storage capacity and lifetime of the battery.

Thus, battery balancing, is needed for fully using all the energy of cells in the battery and increasing longevity of the battery. However, efficiency and safety of existing battery balancing is still to be improved.

In view of the foregoing, there is a need for methods and systems for balancing batteries that overcome the disadvantages of currently-available methods and systems.

SUMMARY

The present disclosure relates to a system for balancing a battery assembly and methods for making and using same.

In accordance with a first aspect disclosed herein, there is set forth a method for balancing a battery assembly including a plurality of batteries in a static state, including:

selecting two or more of the batteries based on a status of the batteries; and controlling active balancing between the selected batteries.

In some embodiments of the disclosed method, the controlling includes controlling a balancing path between the selected batteries to transfer charge therebetween.

In some embodiments of the disclosed method, each of the batteries includes a plurality of cells connected in parallel and/or in series, and the selecting includes selecting cells in different batteries of the selected batteries.

In some embodiments of the disclosed method, the controlling includes controlling a balancing path between the selected cells to transfer charge therebetween.

In some embodiments of the disclosed method, the method further includes isolating a particular battery of the selected batteries from the balancing path upon detecting a current through the particular battery being outside a predetermined current range.

In some embodiments of the disclosed method, the method further includes isolating a particular battery of the selected batteries from the balancing path upon detecting a voltage across the particular battery being outside a predetermined voltage range.

In some embodiments of the disclosed method, the method further includes obtaining the status of the batteries.

In some embodiments of the disclosed method, the obtaining includes obtaining the status of the batteries, the status including a voltage, a capacity, a current, or a combination thereof.

In some embodiments of the disclosed method, the selecting includes selecting the two or more batteries when a difference between respective voltages across the two or more batteries is outside a predetermined voltage difference range.

In some embodiments of the disclosed method, the selecting includes selecting the two or more batteries when the difference between the respective voltages across the two or more batteries is greater than a predetermined voltage threshold.

In some embodiments of the disclosed method, the selecting includes selecting the two or more batteries when a difference between respective capacities of the two or more batteries is outside a predetermined capacity difference range.

In some embodiments of the disclosed method, the selecting includes selecting the two or more batteries when the difference between the respective capacities of the two or more batteries is greater than a predetermined capacity threshold.

In some embodiments of the disclosed method, the selecting includes selecting the two or more batteries when an expected balancing current through the two or more batteries is within a predetermined balancing current range.

In some embodiments of the disclosed method, the selecting includes selecting the two or more batteries when the expected balancing current through the two or more batteries is less than a predetermined current threshold.

In some embodiments of the disclosed method, at least one battery of the battery assembly includes a plurality of cells and is coupled with a battery management unit (BMU), and wherein the controlling includes controlling the BMU to switch to one or more of the cells of the at least one battery for balancing.

In accordance with another aspect disclosed herein, there is set forth a system for balancing a battery assembly including a plurality of batteries in a static state, including:

one or more processors individually or collectively configured to:

select two or more of the batteries based a status of the batteries; and control active balancing between the selected batteries.

In some embodiments of the disclosed system, the processors are configured to control a balancing path between the selected batteries to transfer charge therebetween.

In some embodiments of the disclosed system, each of the batteries includes a plurality of cells connected in parallel and/or in series, and the processors are configured to select cells in different batteries of the selected batteries.

In some embodiments of the disclosed system, the processors are configured to control a balancing path between the selected cells to transfer charge therebetween.

In some embodiments of the disclosed system, the system further includes a protection circuit for isolating a particular battery of the selected batteries from the balancing path upon detecting a current through the particular battery being outside a predetermined current range.

In some embodiments of the disclosed system, the system further includes a protection circuit for isolating a particular battery of the selected batteries from the balancing path upon detecting a voltage across the particular battery being outside a predetermined voltage range.

In some embodiments of the disclosed system, the processors are configured to obtain the status of the batteries.

In some embodiments of the disclosed system, the obtained status of the batteries includes a voltage, a capacity, a current, or a combination thereof.

In some embodiments of the disclosed system, the processors are configured to select the two or more batteries when a difference between respective voltages across the two or more batteries is outside a predetermined voltage difference range.

In some embodiments of the disclosed system, the processors are configured to select the two or more batteries when the difference between the respective voltages across the two or more batteries is greater than a predetermined voltage threshold.

In some embodiments of the disclosed system, the processors are configured to select the two or more batteries when a difference between respective capacities of the two or more batteries is outside a predetermined capacity difference range.

In some embodiments of the disclosed system, the processors are configured to select the two or more batteries when the difference between the respective capacities of the two or more batteries is greater than a predetermined capacity threshold.

In some embodiments of the disclosed system, the processors are configured to select the two or more batteries when an expected balancing current through the two or more batteries is within a predetermined balancing current range.

In some embodiments of the disclosed system, the processors are configured to select the two or more batteries when the expected balancing current through the two or more batteries is less than a predetermined current threshold.

In some embodiments of the disclosed system, at least one battery of the battery assembly includes a plurality of cells and is coupled with a battery management unit (BMU), and wherein the processors are configured to control the BMU to switch to one or more cells of the at least one battery for balancing.

In accordance with another aspect disclosed herein, there is set forth an apparatus for battery balancing in a static state, including:

a battery assembly including a plurality of batteries; and
the system for balancing the battery assembly, the system being coupled with the batteries.

In accordance with another aspect disclosed herein, there is set forth a non-transitory computer-readable storage medium including machine-executable code that, upon execution by one or more processors, implements a method for balancing a battery assembly including a plurality of batteries in a static state.

In accordance with another aspect disclosed herein, there is set forth a method for balancing a battery assembly including a plurality of batteries in a discharging state, including:

selecting one or more of the batteries based on a status of the batteries; and
controlling discharging of the selected batteries for balancing the batteries.

In some embodiments of the disclosed method, the method further includes obtaining status of the batteries.

In some embodiments of the disclosed method, the controlling includes prioritizing the discharging of the selected batteries to be in an order based on respective voltages across the batteries.

In some embodiments of the disclosed method, the prioritizing includes prioritizing in such a way that a first battery of the batteries is discharged prior to a second battery of the batteries when a voltage across the first battery is greater than a voltage across the second battery by a difference greater than a target voltage difference.

In some embodiments of the disclosed method, the prioritizing includes prioritizing in such a way that first and second batteries of the batteries are simultaneously discharged when a difference between voltages across the first and second batteries is less than or equal to a target voltage difference.

In some embodiments of the disclosed method, the method further includes:

selecting two or more of the batteries for active balancing based on the obtaining; and
control active balancing between the two or more selected batteries.

In some embodiments of the disclosed method, the selecting includes selecting a discharging battery of the batteries that has excess discharging capability.

In some embodiments of the disclosed method, the controlling includes controlling a balancing path between the selected batteries to transfer charge therebetween.

In some embodiments of the disclosed method, each of the batteries includes a plurality of cells connected in parallel and/or in series, and the selecting includes selecting cells in the selected batteries.

In some embodiments of the disclosed method, the controlling includes controlling a balancing path between the selected cells to transfer charge therebetween.

In some embodiments of the disclosed method, the method further includes isolating a particular battery of the selected batteries from the balancing path upon detecting a current through the particular, battery being outside a predetermined current range.

In some embodiments of the disclosed method, the method further includes isolating a particular battery of the selected batteries from the balancing path upon detecting a voltage across the particular battery being outside a predetermined voltage range.

In some embodiments of the disclosed method, the selecting includes selecting the two or more batteries when a difference between respective voltages across the two or more batteries is outside a predetermined voltage difference range.

In some embodiments of the disclosed method, the selecting includes selecting the two or more batteries when the difference between the respective voltages across the two or more batteries is greater than a predetermined voltage threshold.

In some embodiments of the disclosed method, the selecting includes selecting the two or more batteries when a difference between respective capacities of the two or more batteries is outside a predetermined capacity difference range.

In some embodiments of the disclosed method, the selecting includes selecting the two, or more batteries when the difference between the respective capacities of the two or more batteries is greater than a predetermined capacity threshold.

In some embodiments of the disclosed method, the selecting includes selecting the two or more batteries when an expected balancing current through the two or more batteries is within a predetermined balancing current range.

In some embodiments of the disclosed method, the selecting includes selecting the two or more batteries when the expected balancing current through the two or more batteries is less than a predetermined current threshold.

In accordance with another aspect disclosed herein, there is set forth a system for balancing a battery assembly including a plurality of batteries in a discharging state, including:

one or more processors individually or collectively configured to:

select one or more of the batteries based on a status of the batteries; and control discharging of the selected batteries to balance the batteries.

In some embodiments of the disclosed system, the processors are configured to obtain the status of the batteries.

In some embodiments of the disclosed system, the processors are configured to prioritize the discharging of the selected batteries in an order based on respective voltages across the batteries.

In some embodiments of the disclosed system, the processors are configured to prioritize the discharging in such a way that a first battery of the batteries is discharged prior to a second battery of the batteries when a voltage across the first battery is greater than a voltage across the second battery by a difference greater than a target voltage difference.

In some embodiments of the disclosed system, the processors are configured to prioritize the discharging in such a way that first, and second batteries of the batteries are simultaneously discharged when a difference between voltages across the first and second batteries is less than or equal to a target voltage difference.

In some embodiments of the disclosed system, the processors are configured to:

select two or more of the batteries for active balancing based on the obtaining; and control active balancing between the two or more selected batteries.

In some embodiments of the disclosed system, the processors are configured to select a discharging battery of the batteries that has excess discharging capability.

In some embodiments of the disclosed system, the processors are configured to control a balancing path between the selected batteries to transfer charge therebetween.

In some embodiments of the disclosed system, each of the batteries includes a plurality of cells connected in parallel and/or in series, and the processors are configured to select cells in the selected batteries.

In some embodiments of the disclosed system, the processors are configured to control a balancing path between the selected cells to transfer charge therebetween.

In some embodiments of the disclosed system, the processors are configured to isolate a particular battery of the selected batteries from the balancing path upon detecting a current through the particular battery being outside a predetermined current range.

In some embodiments of the disclosed system, the processors are configured to isolate a particular battery of the selected batteries from the balancing path upon detecting a voltage across the particular battery being outside a predetermined voltage range.

In some embodiments of the disclosed system, the processors are configured to select the two or more batteries when a difference between respective voltages across the two or more batteries is outside a predetermined voltage difference range.

In some embodiments of the disclosed system, the processors are configured to select the two or more batteries when the difference between the respective voltages across the two or more batteries is greater than a predetermined voltage threshold.

In some embodiments of the disclosed system, the processors are configured to select the two or more batteries when a difference between respective capacities of the two or more batteries is outside a predetermined capacity difference range.

In some embodiments of the disclosed system, the processors are configured to select the two or more batteries when the difference between the respective capacities of the two or more batteries is greater than a predetermined capacity threshold.

In some embodiments of the disclosed system, the processors are configured to select the two or more batteries when an expected balancing current through the two or more batteries is within a predetermined balancing current range.

In some embodiments of the disclosed system, the processors are configured to select the two or more batteries when the expected balancing current through the two or more batteries is less than a predetermined current threshold.

In accordance with another aspect disclosed herein, there is set forth an apparatus for battery balancing in a discharging state, including:

a battery assembly including a plurality of batteries; and the system for balancing the battery assembly, the system being coupled with the batteries.

In accordance with another aspect disclosed herein, there is set forth a non-transitory computer-readable storage medium including machine-executable code that, upon execution by one or more processors, implements the method for balancing a battery assembly including a plurality of batteries in a discharging state.

In accordance with another aspect disclosed herein, there is set forth a method for balancing a battery assembly including a plurality of batteries in a charging state, including:

selecting one or more of the batteries based on a status of the batteries; and control charging of the selected batteries for balancing the batteries.

In some embodiments of the disclosed method, the method further includes obtaining a status of the batteries.

In some embodiments of the disclosed method, the controlling includes prioritizing the charging of the selected batteries to be in an order based on respective voltages across the selected batteries.

In some embodiments of the disclosed method, the prioritizing includes prioritizing in such a way that a first battery of the batteries is charged prior to a second battery of the batteries when a voltage across the second battery is greater than a voltage across the first battery by a difference greater than a target voltage difference.

In some embodiments of the disclosed method, the prioritizing includes prioritizing in such a way that first and second batteries of the batteries are simultaneously charged when a difference between voltages across the first and second batteries is less than or equal to a target voltage difference.

In some embodiments of the disclosed method, the controlling includes prioritizing the charging of the selected batteries to be in an order based on respective capacities of the selected batteries.

In some embodiments of the disclosed method, the prioritizing includes prioritizing in such a way that a first battery of the batteries is charged prior, to a second battery of the batteries when a capacity of the second battery is greater than a capacity of the first battery by a difference greater than a target capacity difference.

In some embodiments of the disclosed method, the prioritizing includes prioritizing in such a way that first and second batteries of the batteries are simultaneously charged when a difference between capacities of the first and second batteries is less than or equal to a target capacity difference.

In some embodiments of the disclosed method, each of the batteries includes a plurality of cells connected in parallel and/or in series, wherein the controlling includes:

selecting one or more cells of the batteries based on the obtaining; and controlling charging of the selected cells for balancing the cells.

In some embodiments of the disclosed method, the controlling includes prioritizing the charging of the selected cells to be in an order based on respective voltages across the selected cells.

In some embodiments of the disclosed method, the prioritizing includes prioritizing in such a way that a first cell of the selected cells is charged prior to a second cell of the selected cells when a voltage across the second cell is greater than a voltage across the first cell by a difference greater than a taut voltage difference.

In some embodiments of the disclosed method, the prioritizing includes prioritizing in such a way that first and second cells of the cells are simultaneously charged when a difference between voltages across the first and second cells is less than or equal to a target voltage difference.

In some embodiments of the disclosed method, the controlling includes prioritizing the charging of the selected cells to be in an order based on respective capacities across the selected cells.

In some embodiments of the disclosed method, the prioritizing includes prioritizing in such a way that a first cell of the selected cells is charged prior to a second cell of the selected cells when a capacity of the second cell is greater than a capacity of the first cell by a difference greater than a target capacity difference.

In some embodiments of the disclosed method, the prioritizing includes prioritizing in such a way that first and second cells of the cells are simultaneously charged when a difference between capacities of the first and second cells is less than or equal to a target capacity difference.

In accordance with another aspect disclosed herein, there is set forth a system for balancing a battery assembly including a plurality of batteries in a charging state, including:

one or more processors individually or collectively configured to:

select one or more of the batteries based on a status of the batteries; and control charging of the selected batteries to balance the batteries.

In some embodiments of the disclosed system, the processors are configured to obtain the status of the batteries.

In some embodiments of the disclosed system, the processors are configured to prioritize the charging of the selected batteries to be in an order based on respective voltages across the selected batteries.

In some embodiments of the disclosed system, the processors are configured to prioritize in such a way that a first battery of the batteries is charged prior to a second battery of the batteries when a voltage across the second battery is greater than a voltage across the first battery by a difference greater than a target voltage difference.

In some embodiments of the disclosed system, the processors are configured to prioritize in such a way that first and second batteries of the batteries are simultaneously charged when a difference between voltages across the first and second batteries is less than or equal to a target voltage difference.

In some embodiments of the disclosed system, the processors are configured to prioritize the charging of the selected batteries to be in an order based on respective capacities across the selected batteries.

In some embodiments of the disclosed system, the processors are configured to prioritize in such a way that a first battery of the batteries is charged prior to a second battery of the batteries when a capacity of the second battery is greater than a capacity of the first battery by a difference greater than a target capacity difference.

In some embodiments of the disclosed system, the processors are configured to prioritize in such a way that first and second batteries of the batteries are simultaneously charged when a difference between capacities of the first and second batteries is less than or equal to a target capacity difference.

In some embodiments of the disclosed system, each of the batteries includes a plurality of cells connected in parallel and/or in series, wherein the processors are configured to:

select one or more cells of the batteries based on the obtaining; and control charging of the selected cells for balancing the cells.

In some embodiments of the disclosed system, the processors are configured to prioritize the charging of the selected cells in an order based on respective voltages across the selected cells.

In some embodiments of the disclosed system, the processors are configured to prioritize in such a way that a first cell of the selected cells is charged prior to a second cell of the selected cells when a voltage across the second cell is greater than a voltage across the first cell by a difference greater than a target voltage difference.

In some embodiments of the disclosed system, the processors are configured to prioritize in such a way that a first and second cells of the cells are simultaneously charged when a difference between voltages across the first and second cells is less than or equal to a target voltage difference.

In some embodiments of the disclosed system, the processors are configured to prioritize the charging of the selected cells in an order based on respective capacities of the selected cells.

In some embodiments of the disclosed system, the processors are configured to prioritize in such a way that a first cell of the selected cells is charged prior to a second cell of the selected cells when a capacity of the second cell is greater than a capacity of the first cell by a difference greater than a target capacity difference.

In some embodiments of the disclosed system, the processors are configured to prioritize in such a way that first and second cells of the cells are simultaneously charged when a difference between capacities of the first and second cells is less than or equal to a target capacity difference.

In accordance with another aspect disclosed herein, there is set forth an apparatus for battery balancing in a discharging state, including:

a battery assembly including a plurality of batteries; and the system for balancing a battery assembly, the system being coupled with the batteries.

In accordance with another aspect disclosed herein, there is set forth a non-transitory computer-readable storage medium including machine-executable code that, upon execution by one or more processors, implements the method for balancing a battery assembly including a plurality of batteries in a discharging state.

Figure 1:
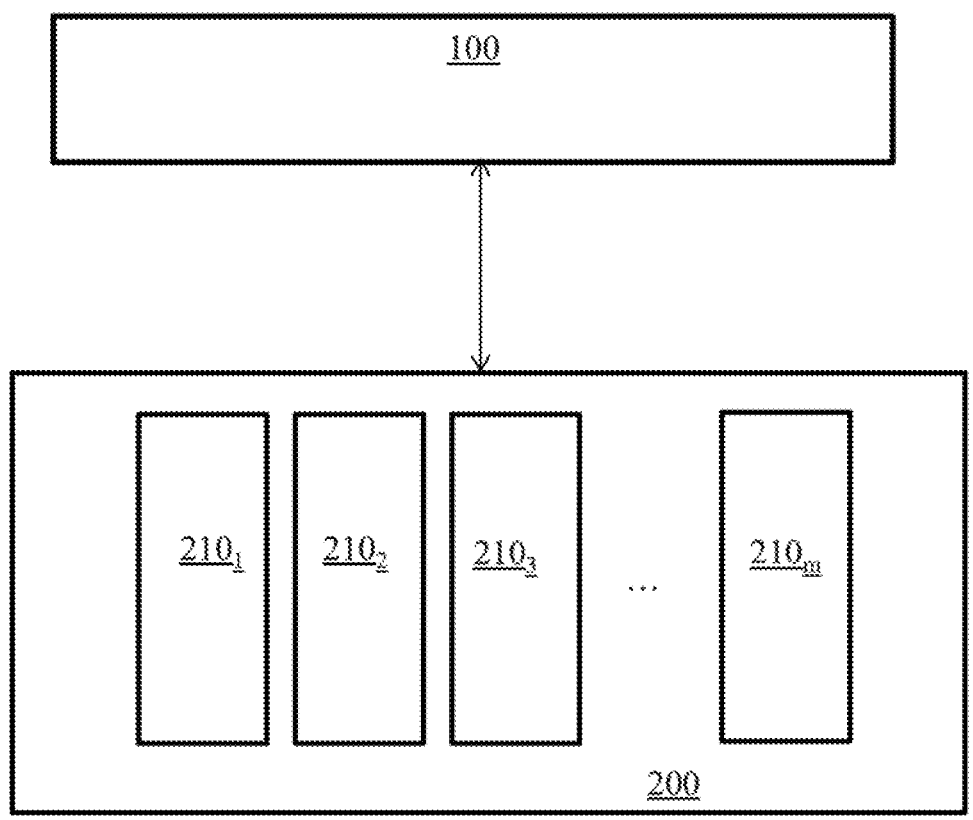
FIG. 1 is an exemplary top-level block diagram illustrating an embodiment of a battery management system for balancing a battery assembly.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available methods and systems for battery balancing need to be improved, a method and system that improve efficiency in battery balancing can prove desirable and provide a basis for a wide range of applications, such as computers, medical equipment, automobiles, aerial and other vehicles, computer data centers, and/or telecommunications systems. This result can be achieved, according to embodiments disclosed herein, by a battery management system 100 as illustrated in FIG. 1.

Turning to FIG. 1, the battery management system 100 is shown as being coupled with a battery assembly 200. The battery assembly 200 can include one or more batteries 210. At least one of the batteries 210 can be rechargeable. The battery assembly 200 of FIG. 1, for example, includes a predetermined number m of batteries, including $210_1$, $210_2$, ..., $210_m$. The batteries 210 can be connected in series, parallel and/or a combination of both so the battery assembly 200 can deliver a predetermined voltage, current, capacity, and/or power density.

The battery management system 100 can be coupled with the battery assembly 200 by being electrically connected, to the battery assembly 200 for electric charge transport, being in communication with the battery assembly 200 for data exchange, or a combination thereof. In certain embodiments, the battery management system 100 can be coupled with one or more of the batteries 210. The battery management system 100 preferably can couple with each of the batteries 210. The battery management system 100 thereby can obtain a status of the battery assembly 200 and balance the battery assembly 200 based upon the status. By balancing the battery assembly 200, energy of the batteries 210 can be fully used and longevity of the batteries 210 can be increased.

The battery assembly 200 can be in a static state, a discharging state and/or a charging state. According to the state of the battery assembly 200, the battery management system 100 can balance the battery assembly 200 in one or more suitable manners, respectively. Because the battery assembly 200 can be balanced in any state, balancing can be time-efficient.

Figure 2:
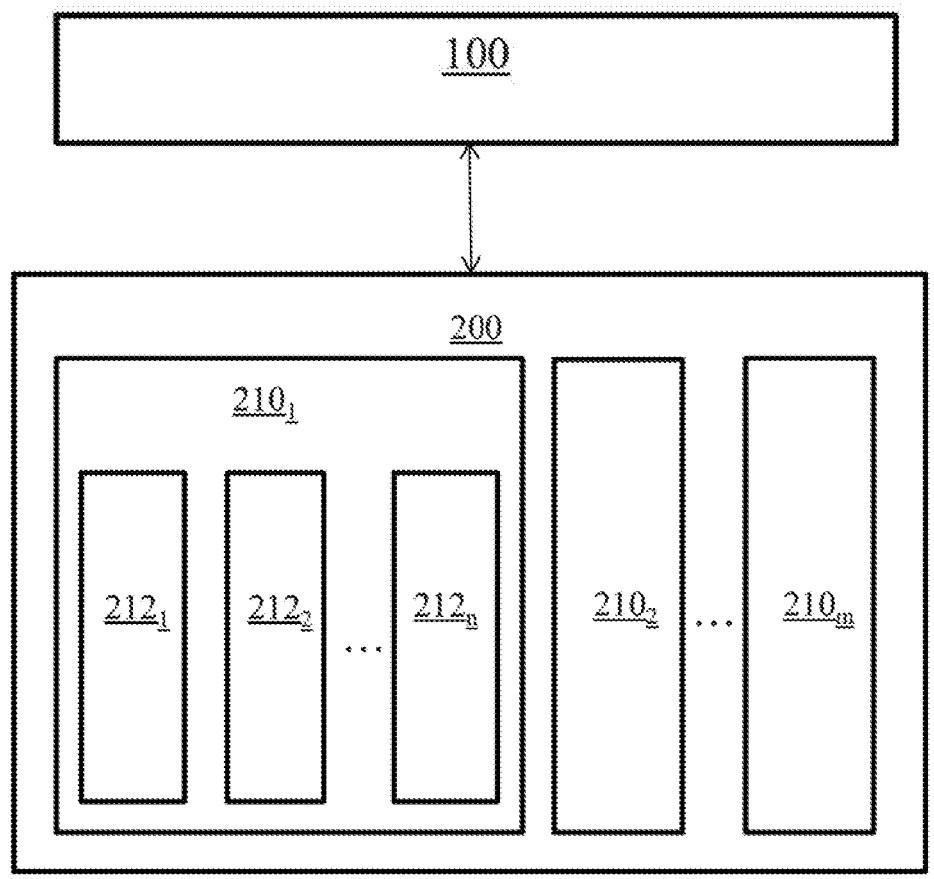
FIG. 2 is an exemplary block diagram illustrating an embodiment of the battery assembly of FIG. 1, wherein at least one battery of the battery assembly comprises a plurality of cells.

Turning to FIG. 2, battery $210_1$ of the battery assembly 200 is shown as including a plurality of cells 212 including cells $212_1, 212_2, \ldots, 212_n$. The cells 212 can be any type of battery cells, including, but not limited to, lead-acid cells, lithium air cells, lithium-ion cells, nickel-cadmium cells, nickel-metal hydrogen cells and the like. At least one of the cells 212 can be rechargeable. The cells 212 can be connected in a series, parallel or a combination of both so the battery $210_1$ can deliver a preselected voltage, current, capacity, and/or power density.

Although the detail of battery $210_1$ is shown in FIG. 2, each of the batteries 210 can comprise a plurality of cells 212 in the manner set forth above with reference to battery $210_1$. The number of cells 212 in each battery 210 can be uniform and/or different between the batteries 210. Connection between the cells 212 in each of the batteries 210 can be uniform and/or different between the batteries 210.

In certain embodiments, the battery management, system 100 can obtain a status of the cells 212 and balance the cells 212 based upon the status. By balancing the cells 212, energy of the cells 212 can be fully used and longevity of the cells 212 can be increased.

Figure 3:
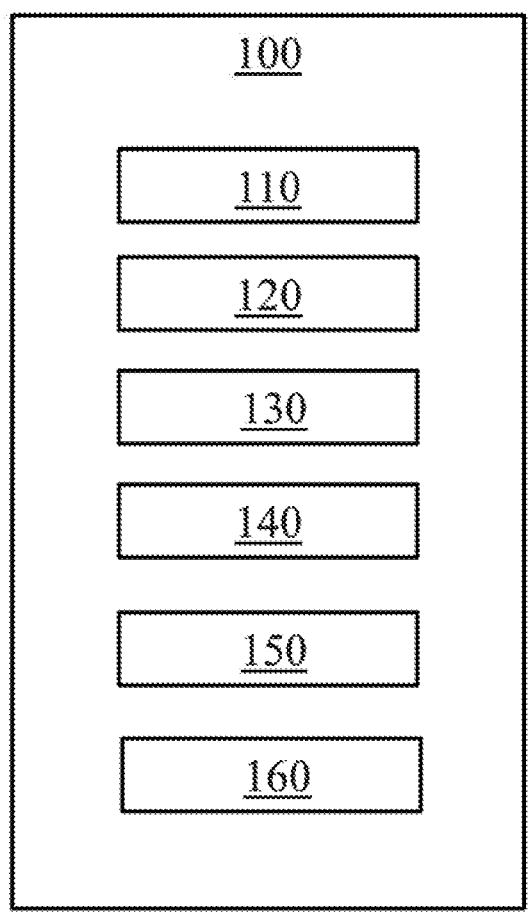
FIG. 3 is an exemplary block diagram illustrating an alternative embodiment of the battery management system of FIG. 1, wherein the battery management system includes a control processor and memory.

FIG. 3 illustrates an exemplary embodiment of the battery management system 100. As shown in FIG. 3, the battery management system 100 can include a control processor 110. The control processor 110 can be programmed or otherwise configured for performing data acquisition, data processing, and/or any other functions and operations described herein for balancing the battery assembly 200. Stated somewhat differently, the control processor 110 can be programmed or otherwise configured to perform any functions and operations described herein as being associated with the battery management system 100. Without limitation, the control processor 110 can include one or more general purpose microprocessors (for example, single and/or multi-core processors), application-specific integrated circuits, application-specific instruction-set processors, physics processing units, digital signal processing units, coprocessors, network processing units, encryption processing units, and/or the like. Although described as including a single processor for purposes of illustration only, the battery management system 100 can include any suitable number of uniform and/or different control processors 110.

The control processor 110 can incorporate the functions of a central processing, unit (CPU) implemented on one or more integrated circuits. For example, the control processor 110 can include an arithmetic logic unit (ALU) and/or a control logic section. The ALU can perform operations such as mathematical calculations and logic operations such as AND or OR. The control logic section can retrieve instruction operation codes from a memory 120 (shown in FIG. 3), and initiate a sequence of operations of the ALU required to carry out, the instruction. Thus, the control processor 110 can be a multipurpose and/or programmable device that accepts digital data, processes the digital data, and provides results as output. The control processor 110 can be programmed to implement functions disclosed in the present disclosure.

The battery management system 100 is shown in FIG. 3 as including one or more switch devices 160. The control processor 110, for example, can generate one or more control signals (not shown) for controlling the switch devices 160. The switch devices 160 can be actuated via the control signals. Stated somewhat differently, the switch devices 160 can be selectively turned on/off according to the control signals. For example, a selected control signal can be provided to two or more of the switch devices 160, and/or a selected switch device 160 can receive two or more of the control signals. Optionally, the control processor 110 can be at least partially integrated with one or more of the switch devices 160.

For example, the switch device 160 can include a solid-state switch and/or a solid-state relay each including one or more semiconductor devices. Exemplary semiconductor devices that can be used as the switch device 160 can include diodes, thyristors, and/or transistors such as bipolar transistors or metal-oxide-semiconductor field-effect transistors (MOSFETs). A selected switch device 160 can be coupled to two or more circuit components. Exemplary circuit components can include a selected terminal of a battery and/or a selected terminal of a cell in the battery assembly 200, a power source, and/or a load device. The switch device can be switched on to form an electrical connection between the circuit components, and/or switched off to result in a disconnection between the circuit components.

The control processor 110 can be coupled directly with the switch devices 160 and/or indirectly coupled with the switch devices 160 via one or more intermediate system components of the battery management system 100. Exemplary intermediate system components can include one or more driver circuits (not shown). At least one of the driver circuits can be coupled to the control processor 110 and/or can boost (and/or strengthen) a control signal generated by the control processor 110 for controlling the switch devices 160. Additionally and/or alternatively, the driver circuit can isolate the ALU and/or control logic section from the switch devices 160, detect malfunctions, store and report failures to the control processor 110, serving as a precaution against failure and/or creating auxiliary voltages.

FIG. 3 shows that the battery management system 100 can include a memory 120. The control processor 110 can run (or execute) various software programs and/or sets of instructions stored in the memory 120 to perform various functions for the battery management system 100. The memory 120 can include non-volatile memory, such as one or m to magnetic disk storage devices, flash memory devices and/or other non-volatile solid-state memory devices. The memory 120 can include a random access memory (RAM), static RAM, dynamic RAM, read-only memory (ROM), programmable ROM, erasable programmable ROM, electrically erasable programmable ROM, flash memory, secure digital (SD) card, etc. Although one memory 120 is shown in FIG. 3, the battery management system 100 can include any number of uniform and/or different memories 120.

The battery management system 100 of FIG. 3 is shown as including one or more detectors 130. Each detector 130 can detect a status of the battery assembly 200. A selected detector 130 can include one or more sensors (not shown) for sensing status of one or more of the batteries 210 (shown in FIG. 1). Additionally and/or alternatively, the sensors can sense status of one or more of the cells 212 (Shown in FIG. 2).

For example, the status can include a voltage of the battery assembly 200. An exemplary voltage can include a total voltage across the battery assembly 200, a voltage across one or more batteries 210, a voltage across one or more cells 212, and/or the like. Additionally and/or alternatively, the status can include a capacity of the battery assembly 200. An exemplary capacity can include a total capacity of the battery assembly 200, a capacity of one or more batteries 210, a capacity of one or more cells 212, and/or the like. Additionally and/or alternatively, the status can include a current of the battery assembly 200. An exemplary current can include a current through the battery assembly 200, a current through one or more batteries 210, a current through one or more cells 212, and/or the like. Additionally and/or alternatively, the status can include one or more other parameters of the battery assembly 200, one or more batteries 210, and/or one or more cells 212. Exemplary status can include, but are not limited to, temperature, state of charge (SOC), depth of discharge (DOD), state of health (SOH), resistance, impedance, conductance, self-discharge, ability to accept a charge, number of charge-dicharge cycles, and/or coolant flow if the battery assembly 200 is air or fluid cooled.

In certain examples, the control processor 110 can communicate with the detectors 130, for example, using hardware connectors and buses. Thus, the control processor 110 can obtain the status of the battery assembly 200.

The battery management system 100 can include one or more additional hardware components as desired. Exemplary additional hardware components include, but are not limited to, one or more input/output interfaces 140 as shown in FIG. 3. An exemplary interface can include universal serial bus (USB), digital visual interface (DVI), display port, serial ATA (SATA), IEEE 1394 interface (also known as FireWire), serial, video graphics array (VGA), super video graphics array (SVGA), small computer system interface (SCSI), high-definition multimedia interface (HDMI), audio ports, parallel communication interface, series communication interface, differential communication interface, analog interface (to collecting analog data for analogidigital conversion), and/or proprietary input/output interfaces. The input/output interfaces 140 can operate as a channel for data to transmit between the battery management system. 100 and other devices. Additionally and/or alternatively, the input/output interfaces 140 can include an electrical connection for coupling the battery management system 100 with a load for discharging the battery assembly 200 and/or a power source for charging the battery assembly 200.

Additionally and/or alternatively, the battery management system 100 can include one or more input/output devices 150 (for example, buttons, a keyboard, keypad, trackball, displays, and a monitor), as desired. Additionally and/or alternatively, the battery management system 100 can include a communication module (not shown) for communicating with any internal and/or external controller devices, input devices and/or memories.

Figure 4:
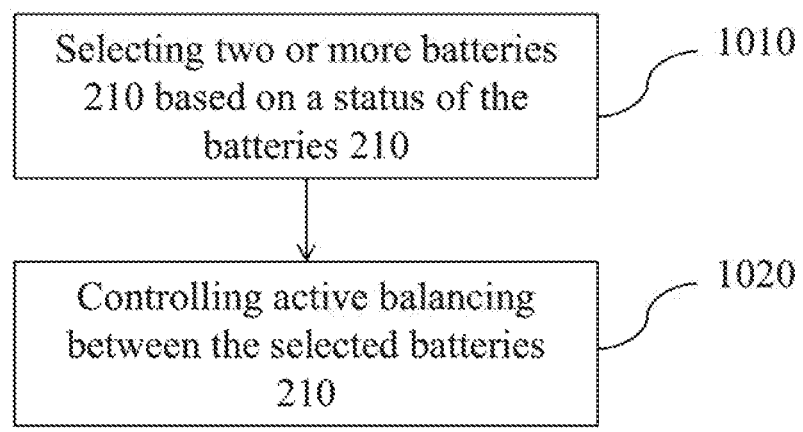
FIG. 4 is an exemplary top-level flow chart illustrating an embodiment of a method for balancing the battery assembly of FIG. 1 in a static state.

FIG. 4 is an exemplary top-level flow chart illustrating a method 1000 for balancing the battery assembly 200 (shown in FIG. 1) in a static state. In the static state, the battery assembly 200 does not receive (or input) power from a power source or provide (or output) power to a load. Additionally and/or alternatively, in the static state, the battery assembly 200 can input and/or output power that is lower than a predetermined power limit.

Based on a status of the batteries 210, two or more batteries 210 of the battery assembly 200 can be selected, at 1010. For example, the battery management system 100 can select two or more batteries 210 based on the obtained status.

Active balancing of the selected batteries is controlled, at 1020. In active balancing, the system 100 can draw electric charge from one battery 210 (or cell 212) and transfer the drawn charge to another battery 210 (or cell 212). For example, the battery management system 100 can draw charge from a first battery 210 having a first voltage and transfer the charge to a second battery 210 having a second voltage when the first voltage is greater than the second voltage. In certain embodiments, the battery management system 100 can transfer the charge directly and/or indirectly between the batteries 210 (or cells 212). The charge can be indirectly transferred between the batteries 210 (or cells 212), for example, via a direct current to direct current (DC-to-DC) convener (not shown).

Additionally and/or alternatively, the status of the battery assembly 200 optionally can be obtained. The battery management system 100 can obtain the status of the battery assembly 2003, for example, by sensing the batteries 210 (shown in FIG. 1) via the detectors 130 (shown in FIG. 3). In some embodiments, the battery management system 100 can obtain the status of each battery 210.

Figure 5:
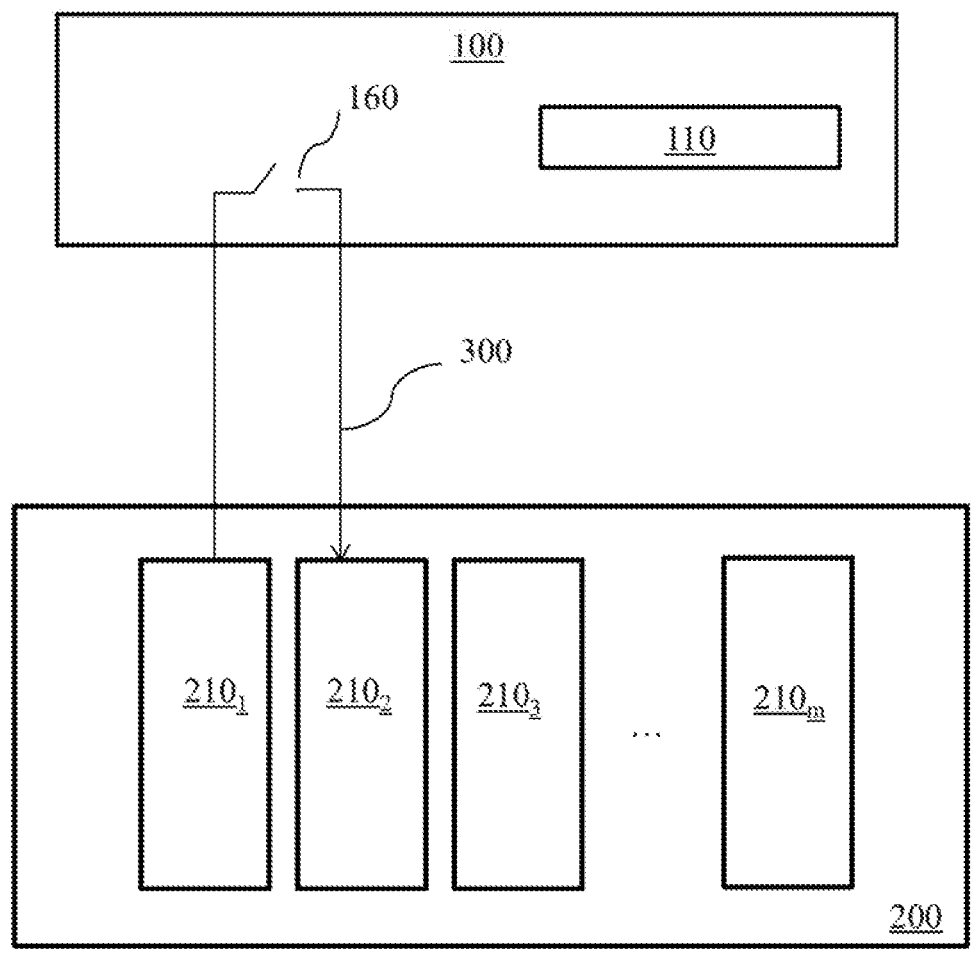
FIG. 5 is an exemplary block diagram illustrating another alternative embodiment of the battery management system of FIG. 1, wherein selected batteries are actively balanced.

FIG. 5 illustrates an alternative embodiment of the battery management system 100, wherein the battery management system 100 can control a balancing path 300 (and/or a current path) to form between a first battery $210_1$ and a second battery $210_2$. The balancing path 300 permits the battery management system 100 to transfer charge between the first and second batteries $210_1$, $210_2$. The balancing path 300 can include one or more electrical conductors, such as wires and/or layers, for electrically connecting the batteries $210_1$, $210_2$ and forming a closed circuit to balance the batteries $210_1$, $210_2$.

FIG. 5 shows the balancing path 300 can include a switch device 160. The switch device 160 is shown as being located in series along the balancing path 300. The balancing path 300 is formed when the switch device 160 can be activated (or closed) to form the closed circuit. When the switch device 160 is deactivated (or opened), the balancing path 300 can comprise an open and/or incomplete circuit, and the batteries $210_1$, $210_2$ no longer have the balancing path 300 formed therebetween to pass a current.

The battery management system 100 can complete the balancing path 300 by switching on the switch device 160 via, for example, a control signal from the control processor 110. The formed balancing path 300 can thus establish an electrical connection between the selected batteries 210.

FIG. 5 shows batteries $210_1$, $210_2$ as the selected batteries 210 for illustrative purposes only. The balancing path 300 can be formed between (and/or among) any predetermined number of selected batteries 210. Although FIG. 5 illustrates one switch device 160, any number of uniform and/or different switch devices 160 can be located along the balancing path 300. The switch devices 160 can open and close the balancing path 300 between the predetermined number of selected batteries 210.

Although FIG. 5 illustrates one balancing path 300, any number of uniform and/or different balancing paths 300 can be formed for connecting the selected batteries 210. The balancing paths 300 can be provided in any predetermined manner for facilitating charge transfer between the selected batteries 210. For example, the balancing path 300 can include a first path connecting positive terminals of the selected batteries and/or a second path connecting negative terminals of the selected batteries 210.

Figure 6:
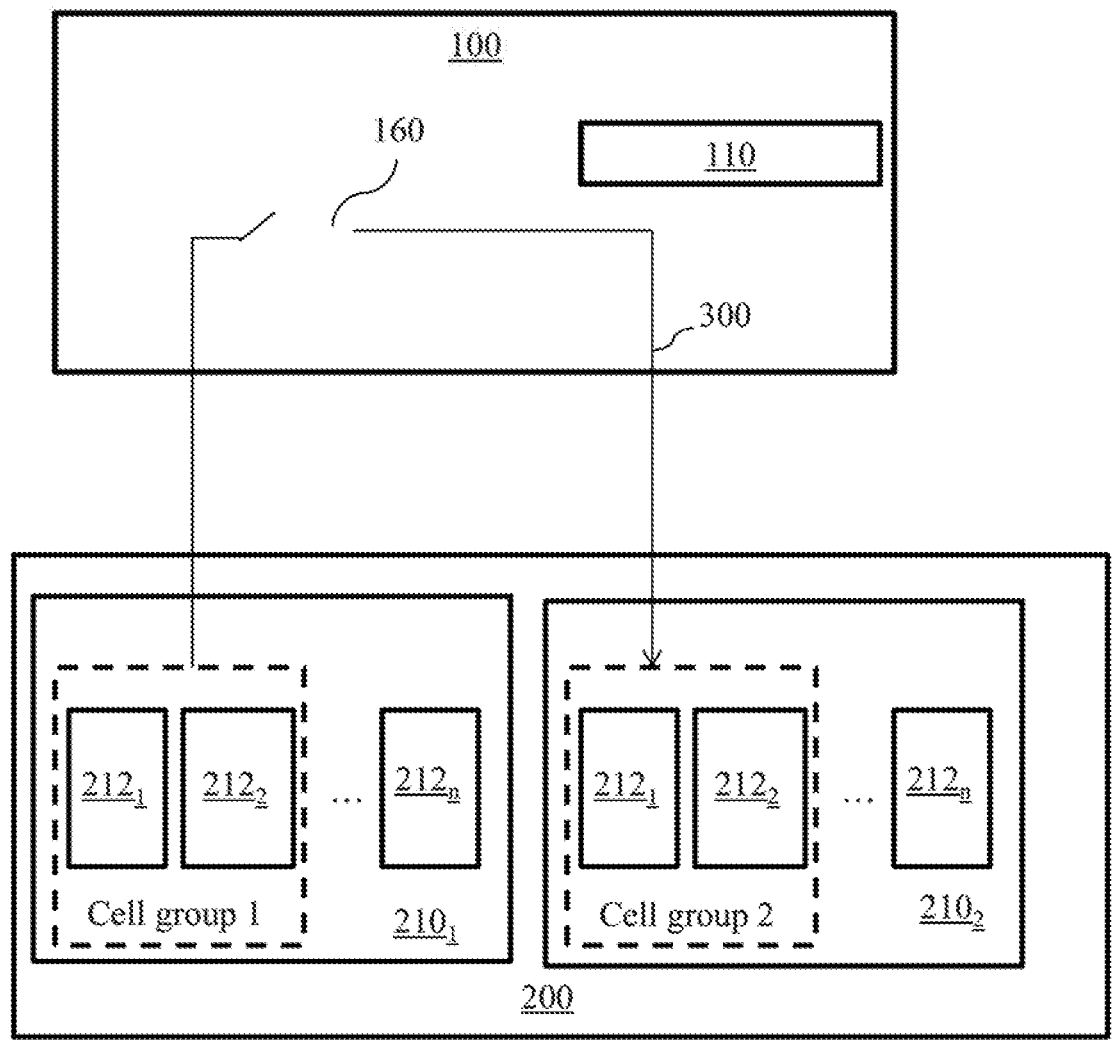
FIG. 6 is an exemplary block diagram illustrating another alternative embodiment of the battery management system of FIG. 1, wherein selected cells are actively balanced.

In certain embodiments, balancing the selected batteries 210, at 1020 (shown in FIG. 4), can include balancing selected cells 212 (shown in FIG. 2) of the selected batteries 210. Turning to FIG. 6, for example, the battery management system 100 can form the balancing path 300 between cells $212_1$, $212_2$ of selected battery $210_1$ and cells $212_1$, $212_2$ of selected battery $210_2$ to transfer charge therebetween. For example, each of the selected cells 212 in FIG. 6 can be individually connected to the balancing path 300 to actively balance with the other selected cells 212.

Advantageously, two or more cells 212 can form a cell group. The cells 212 in the cell group can be disconnected from each other and/or at least partially connected with each other. The cells 212 in the cell group can be connected in a series, parallel or a combination of both. The cell group can be connected to the balancing path 300 as a single circuit component. The cell group can thus be actively balanced with other selected cells 212, cell groups, and/or batteries 210.

Although FIG. 6 shows two cells 212 as being selected from each of the two selected batteries 210, any predetermined number of cells 212 and/or any preselected number of batteries 210 can be selected. The selected cells 212 can be selected from among one or more selected batteries 210. The number of selected cells 212 in each selected battery 210 can be uniform and/or different among the selected batteries 210.

In order to actively balance the cells 212 as shown in FIG. 6, the status of the cells 212 can be obtained. That is, obtaining the status of the batteries 210 can include obtaining the status of the one or more cells 212 of the batteries 210. Additionally and/or alternatively, one or more cells 212 can be selected based on the obtained status. That is, selecting the batteries 210, at 1010 (shown in FIG. 4), can include selecting the cells 212 of the batteries 210 based on the obtained status.

Additionally and/or alternatively, the battery management system 100 can balance the battery assembly 200 by performing balancing between batteries 210 (shown in FIG. 5) and/or between cells 212 simultaneously and/or sequentially. For example, the battery management system 100 can perform balancing between the selected batteries 210 first. After the balancing, between the selected batteries 210 is completed, the battery management system 100 can balance between the selected cells 212 of the selected batteries 210.

Figure 7:
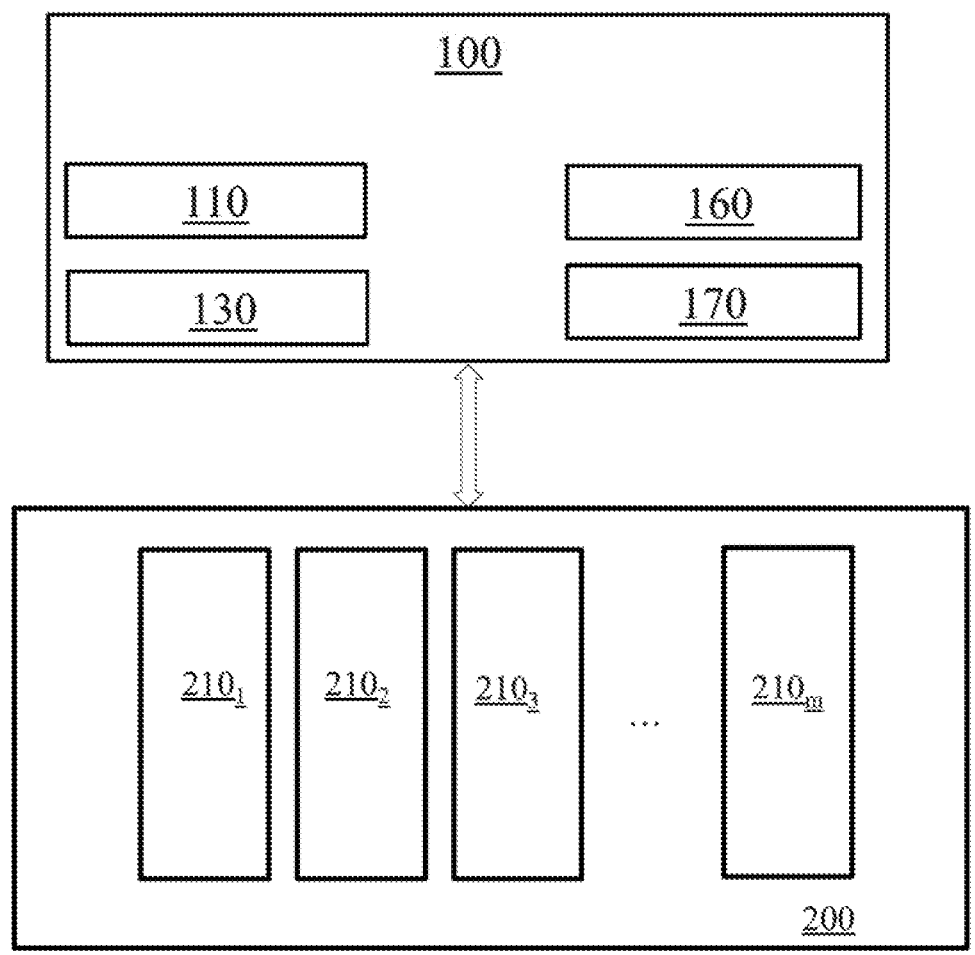
FIG. 7 is an exemplary block diagram illustrating another alternative embodiment of the battery management system of FIG. 1, wherein the battery management system includes a protective circuit.

FIG. 7 shows the battery management system 100 as including a protection circuit 170. The protection circuit 170 can protect the battery assembly 200 from out-of-tolerance ambient and/or operating conditions and/or protect a battery user from the consequences of failure of the battery assembly 200. For example, the protection circuit 170 can protect the battery assembly 200 from undesirable conditions, including excessive current during active balancing, charging and/or discharging, short circuit, over voltage (or overcharging), under voltage (or exceeding preset depth of discharge (DOD) limits), high ambient temperature, overheating (exceeding the cell temperature limit), and/or pressure build up inside a cell.

The protection circuit 170 can protect the battery assembly 200 in any predetermined manner. In certain embodiments, the protection circuit 170 can detect an undesirable condition via detectors 130. The protection circuit 170 can isolate a selected battery 210 from the balancing path 300 upon detecting the undesirable condition associated with the selected battery 210. Additionally and/or alternatively, the protection circuit 170 can isolate the selected battery 210 from the battery management system 100 and/or the rest of the battery assembly 200.

An exemplary undesirable condition can include a current passing through the selected battery 210 being outside a predetermined current range. For example, the protection circuit 170 can isolate the selected battery from the balancing path 300 (shown in FIG. 5 and FIG. 6) upon detecting the current through the selected battery 210 being greater than a predetermined upper current limit.

Additionally and/or alternatively, the undesirable, condition can include a voltage across the selected battery 210 being outside a predetermined voltage range. For example, the protection circuit 170 can isolate the selected battery 210 from the balancing path 300 upon detecting the voltage across the selected battery 210 being greater than a predetermined upper voltage limit and/or lower than a predetermined lower voltage limit.

The predetermined current range and/or the predetermined voltage range can be determined based on safe operating conditions of the battery 210.

Additionally and/or alternatively, the protection circuit 170 can isolate a cell 212 (and/or cell group) from the balancing path 300 and/or other circuit components upon detecting the undesirable condition corresponding to the cell 212 (and/or cell group).

The protection circuit 170 can include any conventional types of sensors and/or circuit components to achieve the protection functions. For example, the protection circuit 170 can include one or more switch devices (not shown) triggered by sensors (not shown) upon sensing the undesirable condition. The switch devices can be, deactivated to electrically disconnect the battery and/or cell from other circuit components. Additionally and/or alternatively, the switch devices can be deactivated to bypass the malfunctioning cell 212 and/or battery 210.

Although FIG. 7 shows one protection circuit 170, the battery management system 100 can include any suitable number of uniform and/or different protection circuits 170. Each battery and/or each cell of the battery assembly 200 can be connected to the same and/or a different protection circuit 170 from another battery 210 and/or cell 212 in the battery assembly 200 to obtain protection. In certain embodiments, each battery 210 can be connected to a respective protection circuit 170. Within each battery 210, a corresponding protection circuit 170 can operate to isolate a cell 212 from other cells 212 upon sensing the undesirable condition associated with the cell 212. Safety of the active balancing can thus be advantageously improved.

The control processor 110 can select, at 1200 (shown in FIG. 4), the batteries 210 based on any preselected criteria. For example, the control processor 110 can select two or more batteries 210 when a difference between respective voltages across the two or more batteries 210 is outside a predetermined voltage difference range. In certain embodiments, the control processor 110 can select the two or more batteries 210 when the difference between the voltages of the respective batteries is greater than a predetermined voltage threshold.

Figure 8:
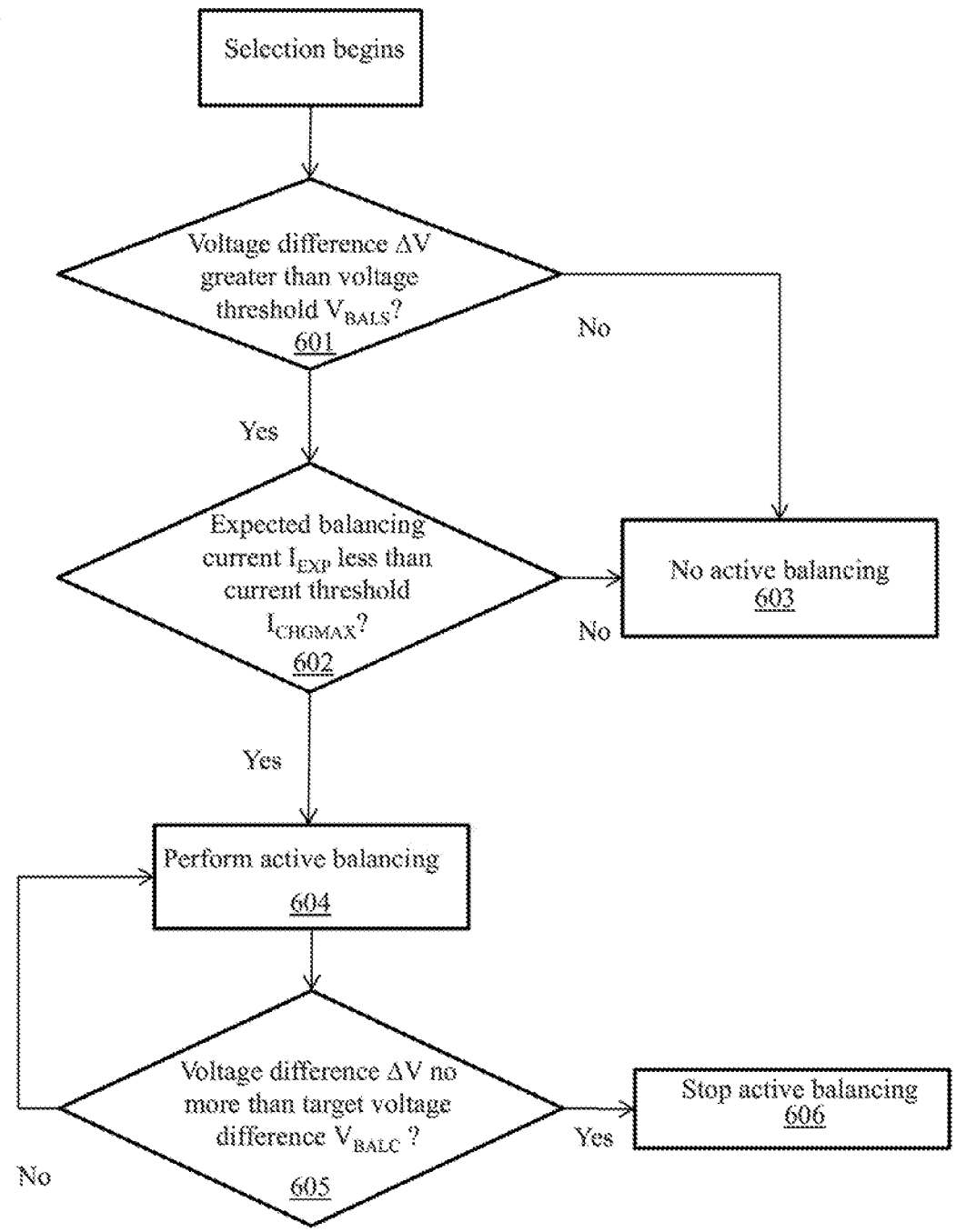
FIG. 8 is an exemplary flow chart illustrating an alternative embodiment of the method of FIG. 4, wherein the batteries are selected at least partially based on voltage.

FIG. 8 shows an exemplary flow chart of an exemplary method 600 for selecting batteries 210 for active balancing. At 601, a voltage difference $\Delta V$ between the selected batteries 210 are compared with a predetermined voltage threshold $V_{BALS}$. Stated somewhat differently, the control processor 110 (shown in FIG. 3) can determine whether the following condition is met between batteries $210_1$, $210_2$:

$$\Delta V > V_{BALS} \qquad \text{Equation (1)}$$

For example, for batteries $210_1$, $210_2$:

$$\Delta V = V1 - V2 \qquad \text{Equation (2)}$$

where V1 and V2 can refer to total voltage across batteries $210_1$, $210_2$, respectively. Assuming, each of the batteries $210_1$, $210_2$ includes a plurality of cells 212 connected in series:

$$V1 = V_{1,1} + \ldots + V_{1,n} \qquad \text{Equation (3-1)}$$

$$V2 = V_{2,1} + \ldots + V_{2,n} \qquad \text{Equation (3-2)}$$

where $V_{x,y}$ refer to voltage of cell y in battery x. When the voltage difference $\Delta V$ is less than or equal to the predetermined voltage threshold $V_{BALS}$, the batteries $210_1$, $210_2$ are not selected for active balancing, at 603.

Additionally and/or alternatively, the control processor 110 can select the two or more batteries 210 when an expected balancing current through the two or more batteries 210 is within a predetermined balancing current range. The expected balancing current can refer to a current that is expected to pass through the balancing path 300 upon forming the balancing path 300. In certain embodiments, the control processor 110 can select the two or more batteries 210 when the expected balancing current through the two or more batteries 210 is less than a predetermined current threshold.

As shown in FIG. 8, at 602, the expected balancing current $I_{EXP}$ can be compared with the predetermined current threshold $I_{CHGMAX}$. In other words, one embodiment of the method 600 can include instructing the control processor 110 to compare the expected balancing current $I_{EXP}$ with the predetermined current threshold $I_{CHGMAX}$. That is, whether the following condition is met between batteries $210_1$, $210_2$:

$$I_{EXP} < I_{CHGMAX} \qquad \text{Equation (4)}$$

For example:

$$I_{EXP} = \frac{\Delta V}{R} \qquad \text{Equation (5)}$$

where R is a total resistance of the balancing path 300. For example:

$$R = R1 + R2 \qquad \text{Equation (6)}$$

where R1 and R2 can refer to total resistances across batteries $210_1$, $210_2$, respectively. Assuming each of the batteries $210_1$, $210_2$ includes a plurality of cells connected in series:

$$R1 = R_{1,1} + \ldots + R_{1,n} \qquad \text{Equation (7-1)}$$

$$R2 = R_{2,1} + \ldots + R_{2,n} \qquad \text{Equation (7-2)}$$

where $R_{x,y}$ refer to resistance of cell y in battery x. The resistance $R_{x,y}$ can be measured by the detectors 130 (shown in FIG. 3) and/or pre-stored in the memory 120. The resistance $R_{x,y}$ can have different values depending on state of the cell 212. For example, the resistance $R_{x,y}$ can have respective values when the cell 212 is static, charging or discharging. In one example, the resistance $R_{x,y}$ in static state can be used for calculating Equations (7-1), (7-2) in approximation.

Additionally and/or alternatively, the batteries 210 and/or the cells 212 can have very small resistances R1 and R2. A circuit component having a resistance Rp can be added onto the balancing path 300 to increase total resistance of the balancing path 300. Thus, safety of active balancing can advantageously be ensured. For example, Equation (6) can be changed to:

$$R = R1 + R2 + Rp. \qquad \text{Equation (8)}$$

The predetermined current threshold $I_{CHGMAX}$ can be based on a maximum charging current allowed by the selected batteries. The predetermined current threshold $I_{CHGMAX}$ can be pre-stored in the memory 120 (shown in FIG. 3).

When the expected balancing current $I_{EXP}$ is greater than or equal to the predetermined current threshold $I_{CHGMAX}$, the batteries $210_1$, $210_2$ are not selected for active balancing, at 603. When the expected balancing current $I_{EXP}$ is less than the predetermined current threshold $I_{CHGMAX}$, the battery management system 100 can actively balance, at 604, the selected batteries $210_1$, $210_2$. By using Equation (4), the current through the balancing path 300 can advantageously be lower than the predetermined current threshold. Safety of the active balancing can thus be improved.

Additionally and/or alternatively, the control processor 110 can stop the active balancing based on a balance-termination criterion. For example, the control processor 110 can terminate the active balancing when the difference between respective voltages across the two or more batteries is lower than a target voltage difference $V_{BALC}$. At 605, the control processor 110 can compare the voltage difference $\Delta V$ with the target voltage difference $V_{BALC}$. That is:

$$\Delta V \leq V_{BALC} \qquad \text{Equation (9)}$$

When the voltage difference $\Delta V$ is less than or equal to the target voltage difference $V_{BALC}$, the control processor 110 can stop the active balancing, at 606, for example, by disconnecting the balancing path 300. When the voltage difference $\Delta V$ is greater than the target voltage difference $V_{BALC}$, the active balancing can be continued, at 604.

In certain examples, the target voltage difference $V_{BALC}$ can be pre-stored in the memory 120. The target voltage difference $V_{BALC}$ and the predetermined voltage threshold $V_{BALS}$ (in Equation (1)) can be uniform and/or different. Although FIG. 8 shows 602 as following 601, 601 and 602 can be performed in any sequence and/or simultaneously.

Additionally and/or alternatively, the control processor 110 can select two or more batteries 210 when a difference between respective capacities of the two or more batteries 210 is outside a predetermined capacity difference range. In certain embodiments, the control processor 110 can select the two or more batteries 210 when the difference between the respective capacities is greater than a predetermined capacity threshold.

Figures 9, 10:
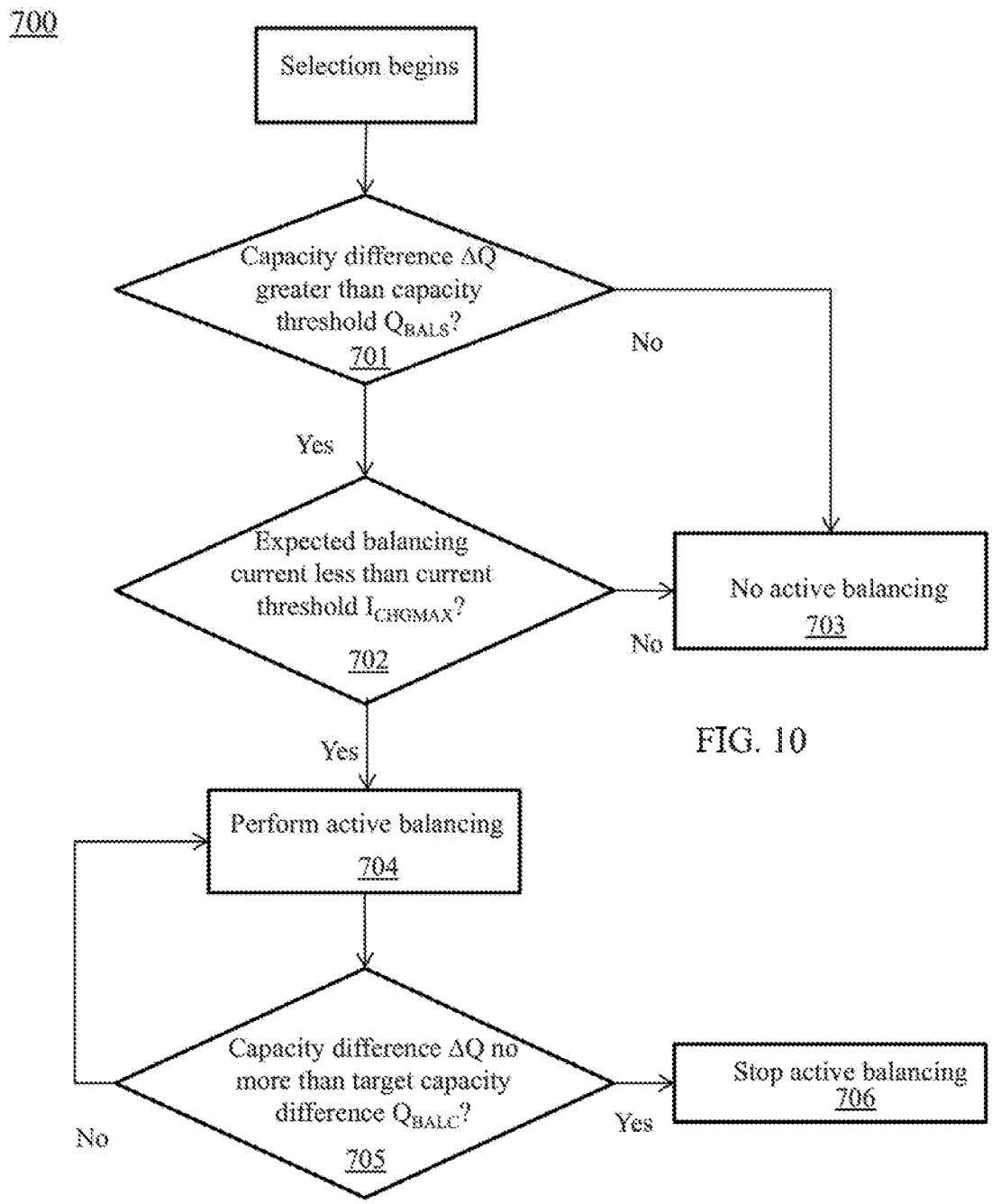
FIG. 9 is an exemplary flow chart illustrating another alternative embodiment of the method of FIG. 4, wherein the batteries are selected at least partially based on capacity.
FIG. 10 is an exemplary top-level flow chart illustrating another alternative embodiment of the method of FIG. 4, wherein the battery assembly is balanced in a discharging state.
Figure 10:
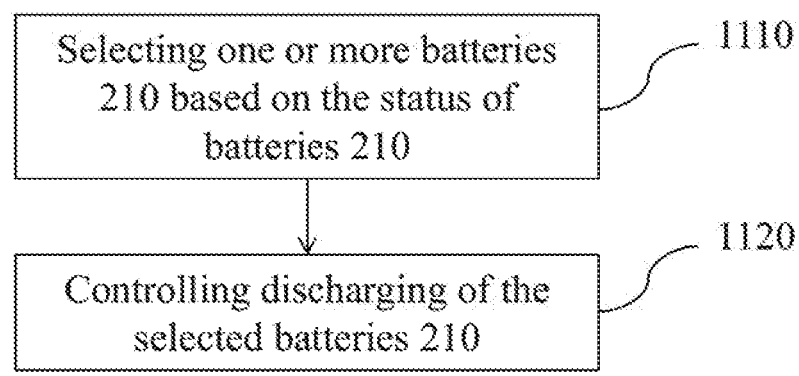

FIG. 9 shows a flow chart of an exemplary method 700, wherein the batteries 210 are selected at least partially based on capacity. At 701, a capacity difference $\Delta Q$ between the selected batteries are compared with the predetermined capacity threshold $Q_{BALS}$. That is, the control processor 110 can determine whether the condition of Equation (10) is met between batteries $210_1$, $210_2$:

$$\Delta Q > Q_{BALS} \qquad \text{Equation (10)}$$

For example, for batteries $210_1$, $210_2$:

$$\Delta Q = Q1 - Q2 \qquad \text{Equation (11)}$$

Q1 and Q2 can refer to total capacities of batteries $210_1$, $210_2$, respectively. Assuming each of the batteries $210_1$, $210_2$ includes a plurality of cells connected in series:

$$Q1=Q_{1,1}+\ldots+Q_{1,n} \quad \text{Equation (12-1)}$$

$$Q2=Q_{2,1}+\ldots+Q_{2,n} \quad \text{Equation (12-2)}$$

where $Q_{x,y}$ refers to capacity of cell y in battery x. When the capacity difference $\Delta Q$ is less than or equal to the predetermined capacity threshold $Q_{BALS}$, the batteries $210_1$, $210_2$ are not selected for active balancing, at 703. When the capacity difference $\Delta Q$ is greater than the predetermined capacity threshold $Q_{BALS}$, selection can be continued.

As shown in FIG. 9, at 702, the expected balancing current $I_{EXP}$ is compared with the predetermined current threshold $I_{CHGMAX}$. The comparison, for example, can be based on Equation (4) above. When the expected balancing current $I_{EXP}$ is greater than or equal to the predetermined current threshold $I_{CHGMAX}$, the batteries $210_1$, $210_2$ are not selected for active balancing, at 703. When the expected balancing current $I_{EXP}$ is less than the predetermined current threshold $I_{CHGMAX}$, the battery management system 100 can actively balance, at 704, the batteries $210_1$, $210_2$.

Additionally and/or alternatively, the control processor 110 can stop the active balancing when the difference between respective capacities of the two or more batteries is lower than a target capacity difference $Q_{BALC}$. At 705, the control processor 110 can compare the capacity difference $\Delta Q$ with the target capacity difference $Q_{BALC}$:

$$\Delta Q \leq Q_{BALC} \quad \text{Equation (13)}$$

When the capacity difference $\Delta Q$ is less than or equal to the target capacity difference $Q_{BALC}$, the control processor 110 can stop the active balancing (shown, at 706), for example, by disconnecting the balancing path 300. When the capacity difference $\Delta Q$ is greater than the target capacity difference $Q_{BALC}$, the active balancing can be continued (shown, at 704).

In certain examples, the target capacity difference $Q_{BALC}$ can be pre-stored in the memory 120. The target capacity difference $Q_{BALC}$ and the predetermined capacity threshold $Q_{BALS}$ (shown in Equation (10)) can be uniform and/or different. Although FIG. 9 shows 702 as following 701, 701 and 702 can be performed in any sequence and/or simultaneously.

FIG. 8 illustrates method 600 as selecting batteries and/or terminating active balance at least partially based on voltage. FIG. 9 illustrates method 700 as selecting batteries and/or terminating active balance at least partially based on capacity. Selecting batteries and/or terminating active balance can be based on voltage, capacity, and/or any other preselected battery characteristic(s), without limitation. For example, a method can select the batteries 210 based on capacity, and terminate active balancing based on voltage. In another example, a method can select the batteries 210 based on voltage, and terminate active balancing based on capacity.

To actively balance selected cells 212 (as shown in FIG. 6), method 600 and/or method 700 can be used. For example, in battery $210_1$, cells $212_1$, $212_2$ are connected in series and can form a cell group 1. In battery $210_2$, cells $212_1$, $212_2$ are connected in series and can form a cell group 2. Thus, voltages V1 and V2 (in Equation (2)) can be calculated as follows:

$$V1=V_{1,1}+V_{1,2} \quad \text{Equation (14-1)}$$

$$V2=V_{2,1}+V_{2,2} \quad \text{Equation (14-2)}$$

Resistances R1 and R2 (in Equation (6)) can be calculated as follows:

$$R1=R_{1,1}+R_{1,2} \quad \text{Equation (15-1)}$$

$$R2=R_{2,1}+R_{2,2} \quad \text{Equation (15-2)}$$

Capacities Q1 and Q2 (in Equation (11)) can be calculated as follows:

$$Q1=Q_{1,1}+Q_{1,2} \quad \text{Equation (16-1)}$$

$$Q2=Q_{2,1}+Q_{2,2} \quad \text{Equation (16-2)}$$

in passive balancing, energy is drawn from the most charged cell and is wasted as heat, usually through one or more resistors. This leads to energy inefficiency especially for applications requiring relatively high electric energy. Using the disclosed methods, the battery assembly 200 can be actively balanced. In other words, extra charge of the high-charged battery/cell can be transferred to the low-charged battery 210 and/or cell 212. Such active balancing is advantageously more energy-efficient than passive balancing.

FIG. 10 is an exemplary top-level flow chart illustrating a method 1100 for balancing the battery assembly 200 in a discharging state. In the discharging state, the battery assembly 200 can output power to a load. A load can include any machine, instrument, or any other device (or system) driven by electric power. Additionally and/or alternatively, the load can include a device having electrical resistance, electrical impedance and/or electrical reactance. For example, the load can include a resistor that consumes electric power. An exemplary load can include a mobile platform, such as an automobile, an aircraft, and/or an unmanned aerial vehicle (UAV).

The method 1100 can be implemented by the battery management system 100 (shown in FIG. 1). One or more batteries 210 of the battery assembly 200 are selected, at 1110, based on a status of the batteries 210. Discharging of the selected batteries 210 is controlled, at 1120. By control the discharging of the selected batteries 210, the discharging process can balance the battery assembly 200. Additionally and/or alternatively, the status of the batten assembly 200 can be obtained.

Figure 11:
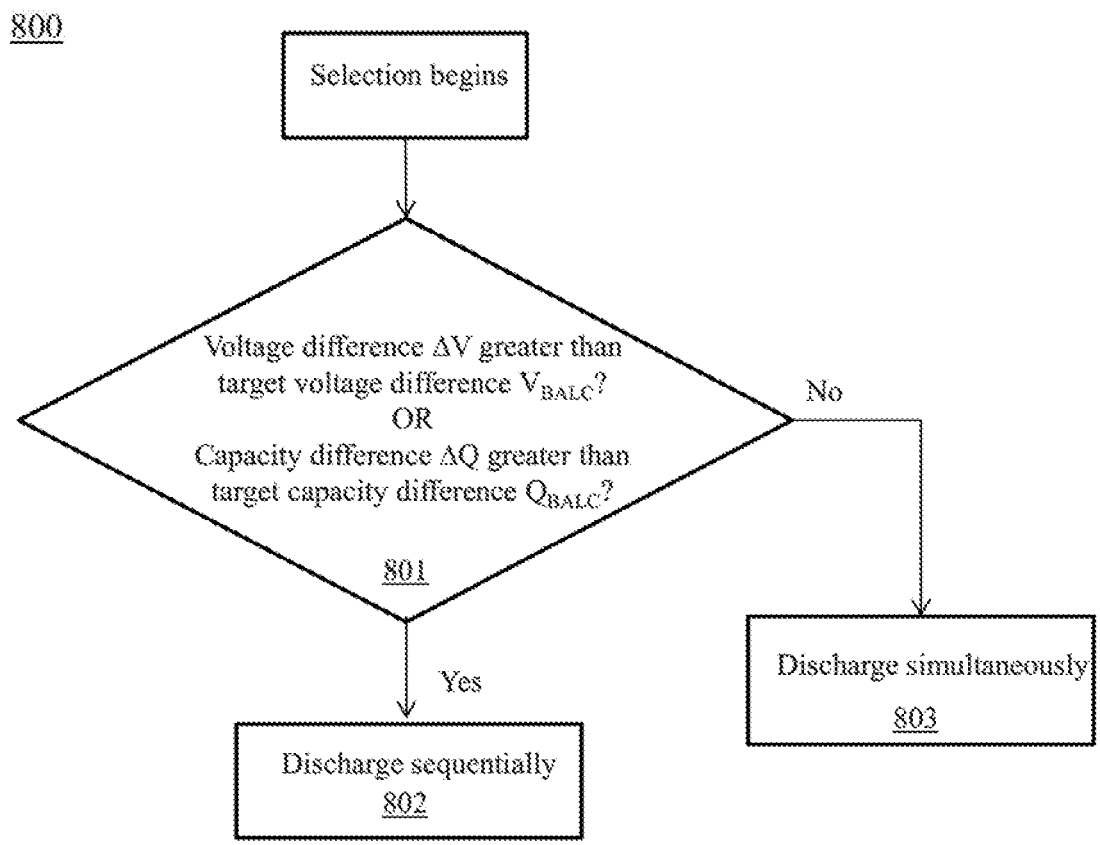
FIG. 11 is an exemplary flow chart illustrating an alternative embodiment of the method of FIG. 10, wherein batteries of the battery assembly are selected for discharging.

In certain embodiments, the battery management system 100 can prioritize discharging of the selected batteries 210 to be in an order based on respective voltages across the batteries 210. In some embodiments, the order can include a sequence. FIG. 11 shows an exemplary flow chart of a method 800 for selecting batteries 210 for discharging. The method 800 can include an evaluation process for two batteries 210. For example, the two batteries 210 can include batteries $210_1$, $210_2$ (shown in FIG. 1).

A voltage difference $\Delta V$ between two batteries can be compared, at 801, with the target voltage difference $V_{BALC}$. Additionally and/or alternatively, a capacity difference $\Delta Q$ between two batteries can be compared, at 801, with the target capacity difference $Q_{BALC}$. When at least one of the following conditions is met, the batteries 210 can be discharged sequentially (at 802):

$$\Delta V > V_{BALC}; \text{ and} \quad \text{Equation (17)}$$

$$\Delta Q > Q_{BALC}. \quad \text{Equation (18)}$$

Thus, the battery management system 100 can discharge battery $210_1$ prior to discharging battery $210_2$. Stated somewhat differently, based on the selection, at 802, battery $210_1$ can be selected for discharging and battery $210_2$ is not yet selected for discharging, $\Delta V$ and $\Delta Q$ can be calculated, for example, using Equation (2) and Equation (11). $V_{BALC}$ and $Q_{BALC}$ can be predetermined and retrieved from the memory 120. When the voltage difference $\Delta V$ is not greater than the target voltage difference $V_{BALC}$, and the capacity difference $\Delta Q$ is not greater than the target capacity difference $Q_{BALC}$, that is:

$$\Delta V \leq V_{BALC}; \text{ and} \qquad \text{Equation (19)}$$

$$\Delta Q \leq Q_{BALC}, \qquad \text{Equation (20)}$$

the batteries can be charged simultaneously, at 803. Optionally, when Equations (19) and (20) are satisfied during discharging, the battery management system 100 can determine that, at least some batteries are balanced, and the discharging can be stopped.

By using method 800, the battery management system 100 can select the batteries 210 to be discharged at a given moment. Stated somewhat differently, based on the method 800, the battery management system 100 can discharge batteries 210 having the highest voltages and/or capacities, when the voltages decrease due to the discharging, batteries 210 having the second highest voltages and/or capacities can join the discharging. At the last stage of discharging, the batteries 210 of the lowest voltage can join the discharging. Thus, after the discharging, voltage and/or capacities difference between at least some of the batteries 210 can be small. The discharging can thus balance the batteries.

Similarly, method 800 can be implemented similarly for evaluating between cells 212, and/or cell groups. Calculation of the $\Delta V$ can be adjusted accordingly. For example, when selecting between cells $212_1$, $212_2$ in battery $210_1$ for discharging, voltage difference $\Delta V$ and the capacity difference $\Delta Q$ can be as follows:

$$\Delta V = V1 - V2 = V_{1,1} - V_{2,1}; \text{ and} \qquad \text{Equation (21)}$$

$$\Delta Q = Q1 - Q2 = Q_{1,1} - Q_{2,1}. \qquad \text{Equation (22)}$$

Thus, after the discharging, voltage difference between at least some of the cells 212 can be small. The discharging can thus balance the cells 212. The cells 212 and/or cell groups can be of uniform and/or different batteries 210.

Without selectively discharging cells 212 and/or batteries 210, the cells 212 and/or batteries 210 can be discharged simultaneously. However, weak cells 212 and/or batteries 210 tend to have lower voltage than the other cells 212 and/or batteries 210, due to either higher internal resistance or faster rate of discharge that results from their smaller capacity. For example, if any of the weak cells 212 in a battery 210 hits an under-voltage-protection limit while the total voltage of the battery 210 is still sufficient to power a load, the full capacity of the battery 210 is not utilized. In another example, if any of the weak batteries 210 hits an under-voltage-protection limit while the total voltage of the battery assembly 200 is still sufficient to power a load, the full capacity of the battery assembly 200 is not utilized.

By using the method 800, the weakest cells 212 and/or batteries 210 are discharged last so the stronger cells 212 and/or batteries 210 are discharged first to be fully utilized. Additionally and/or alternatively, the battery assembly 200 can be balanced via the discharging.

Figure 12:
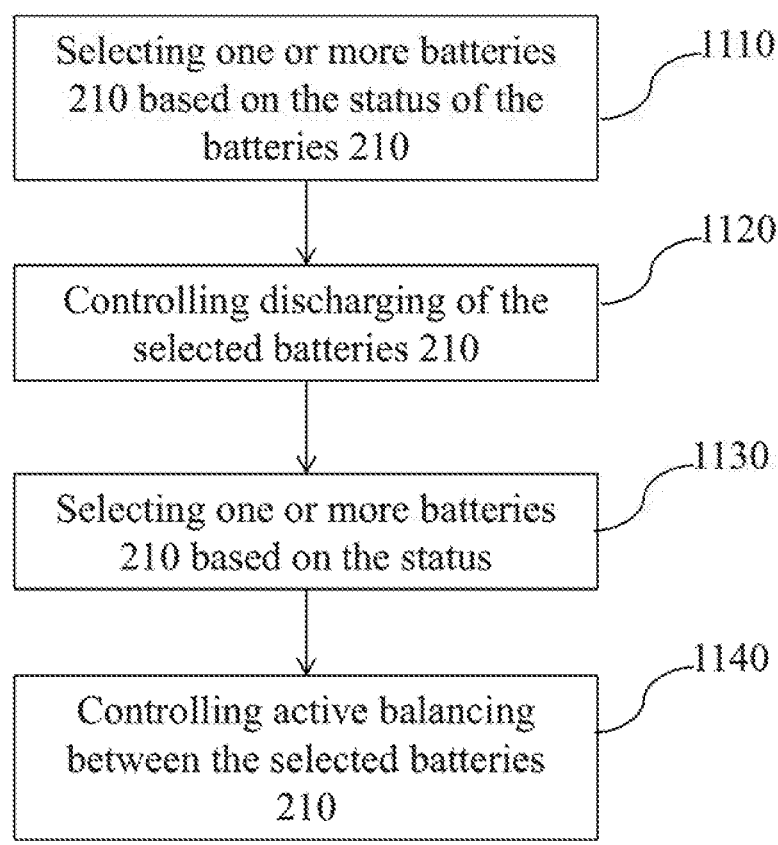
FIG. 12 is an exemplary flow chart illustrating another alternative embodiment of the method of FIG. 10, wherein batteries of the battery assembly are selected for active balancing.

FIG. 12 shows an exemplary flow chart of the method 1100. As shown in FIG. 12, one or more batteries 210 can be selected, at 1130, based on the status of the batteries 210. The batteries 210 can be selected for active balancing. The selected batteries 210 can include at least one discharging battery 210 that has excess discharging capability. Excess discharging capability can refer to ability of giving out energy and/or charge in addition to the energy and/or charge drawn by discharging. For example, when a battery 210 is capable of outputting 20 V at 10 A and the load requires 20 V at 5 A, the battery 210 is capable of supplying more power than requirement of the load. The battery 210 thus can have the excess discharging capability. Additionally and/or alternatively, a discharging battery 210 having excess discharging capability can refer to the battery 210 having at least one discharging cell 212 having excess discharging capability. Active balancing between the batteries 210 selected, at 1130, can be controlled, at 1140.

Figure 13:
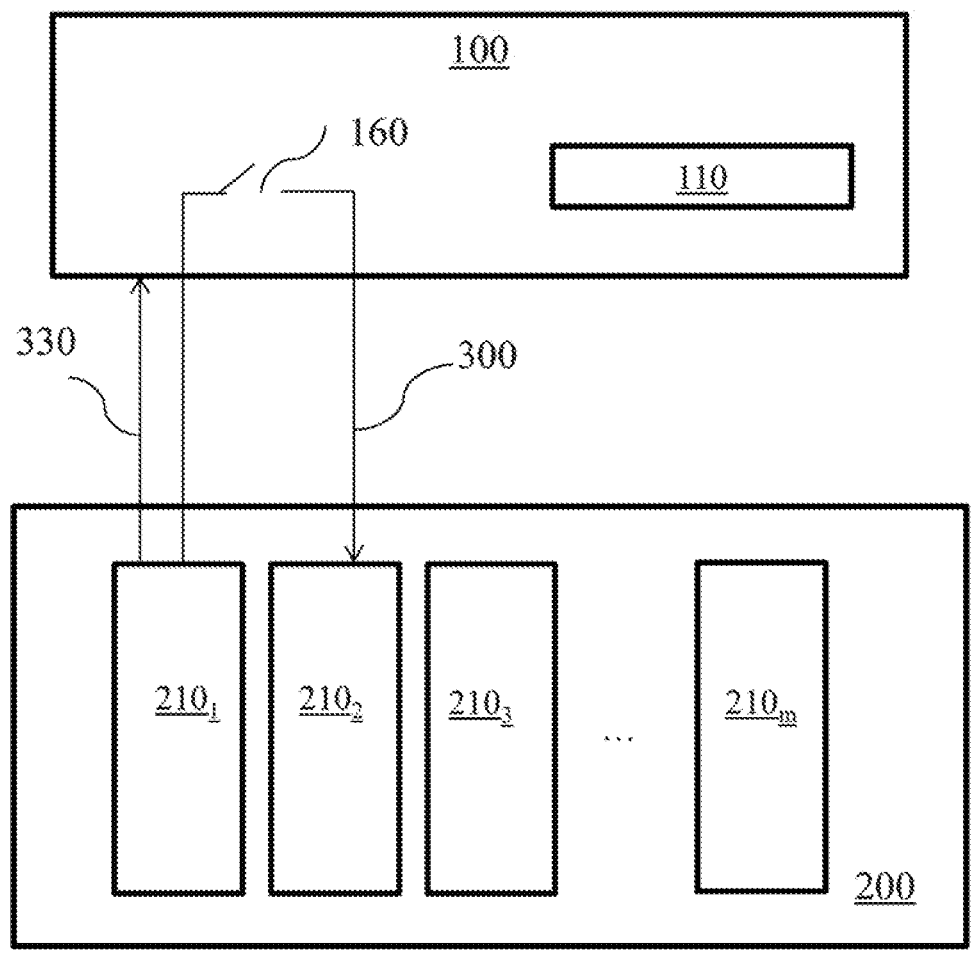
FIG. 13 is an exemplary block diagram illustrating another alternative embodiment of the battery management system of FIG. 1, wherein selected batteries are actively balanced.

Turning to FIG. 13, the battery management system 100 can control the balancing path 300 to form between the batteries $210_1$, $210_2$ to transfer charge therebetween. FIG. 13 shows battery $210_1$ as being a discharging battery and outputs energy/charge via a discharging path 330. Battery $210_1$ can have excess discharging capability and thus can output charge to battery 210.

FIG. 13 shows one discharging battery 210 as being actively balanced with another battery 210. However, any number discharging batteries 210 can be actively balanced with any uniform and/or different number of other batteries 210.

Figure 14:
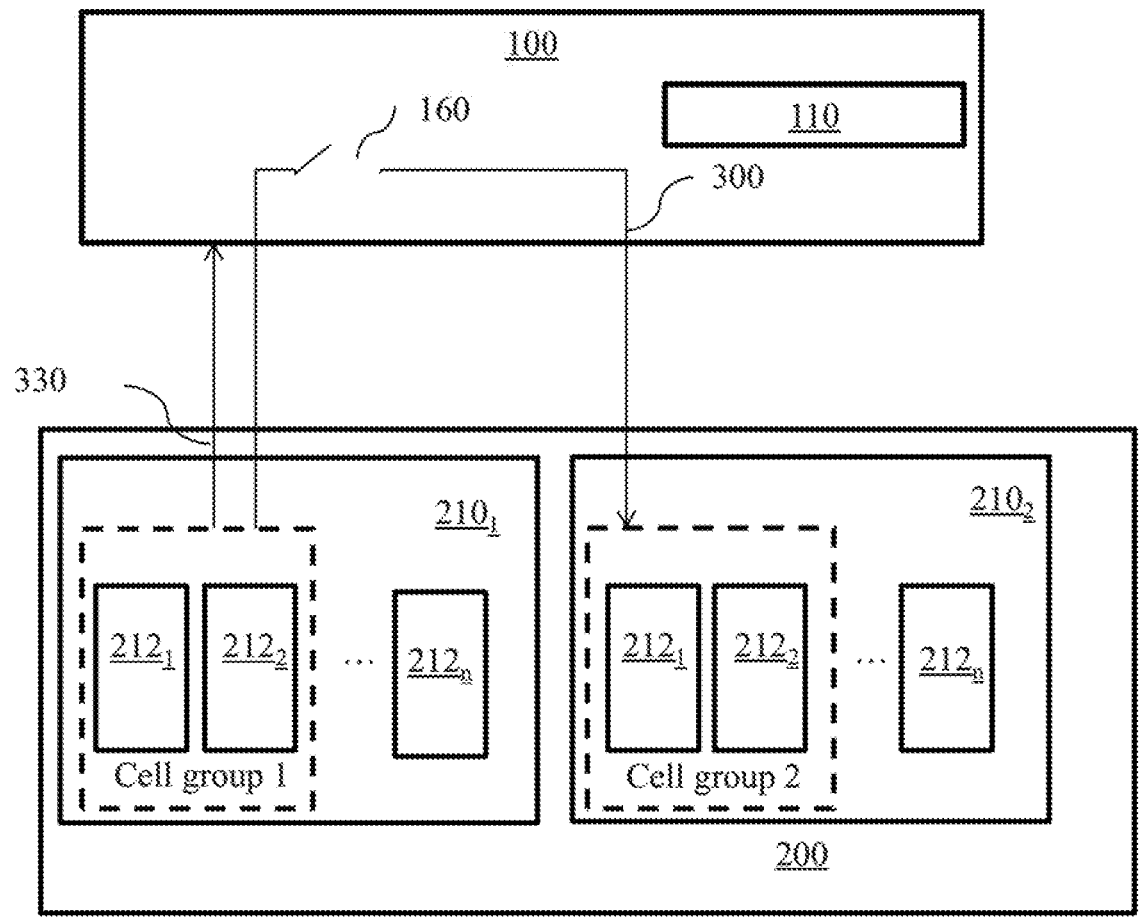
FIG. 14 is an exemplary block diagram illustrating another alternative embodiment of the battery management system of FIG. 1, wherein selected cells are actively balanced.

In certain embodiments, balancing the batteries 210 can include balancing selected cell groups and/or cells 212 of the batteries 210. Turning to FIG. 14, the battery management system 100 can form the balancing path 300 between cell groups 1, 2 of batteries $210_1$, $210_2$, to transfer charge therebetween. Cell group 1 can have excess discharging capability and thus can output charge to cell group 2. Although FIG. 14 shows two cells 212 in each cell group, the cell groups can include any uniform and/or different number of cells 212. Additionally and/or alternatively, one cell 212 having excess discharging capability can output charge to another cell 212.

Therefore, the weaker batteries 210 and/or cells 212 can be actively balanced with stronger batteries 210 and/or cells 212. After the active balancing, when the weaker cells 212 start to discharge, the weak cells 212 can delay the time of reaching the cell under-voltage-protection limit. The battery assembly 200 can advantageously discharge for a longer time.

The control processor 110 can select (at 1130, in FIG. 12) the batteries 210 for active balancing based on any criteria. For example, method 600 (show in FIG. 8) and method 700 (shown in FIG. 9) can be used. Certain criteria can be adjusted because, one or more batteries 210 can be discharging during the active balancing. For example, at 602 and/or at 702, calculation of the expected balancing current $I_{EXP}$ can be adjusted to include a discharging current $I_{DISCHARGE}$. That is. Equation (5) can be adjusted to be:

$$I_{EXP} = \frac{\Delta V}{R} + I_{DISCHARGE} \qquad \text{Equation (23)}$$

Thus, the total expected balancing current $I_{EXP}$ through a discharging battery 210 can be obtained. Safety of active balancing and/or discharging can advantageously be ensured.

Figure 15:
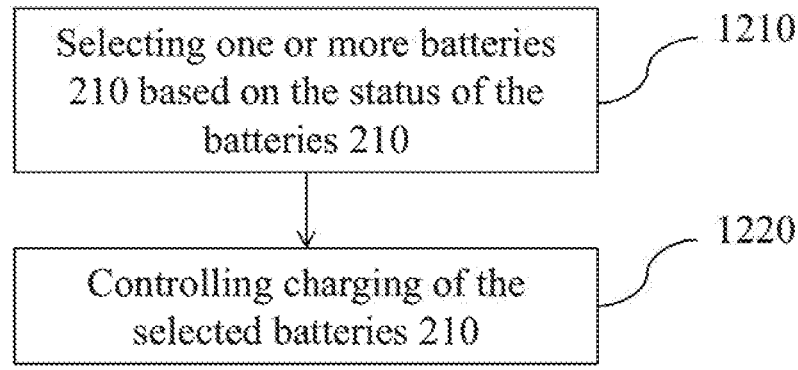
FIG. 15 is an exemplary top-level flow chart illustrating another alternative, embodiment of the method of FIG. 4, wherein the battery assembly is balanced in a charging state.
Figure 16:
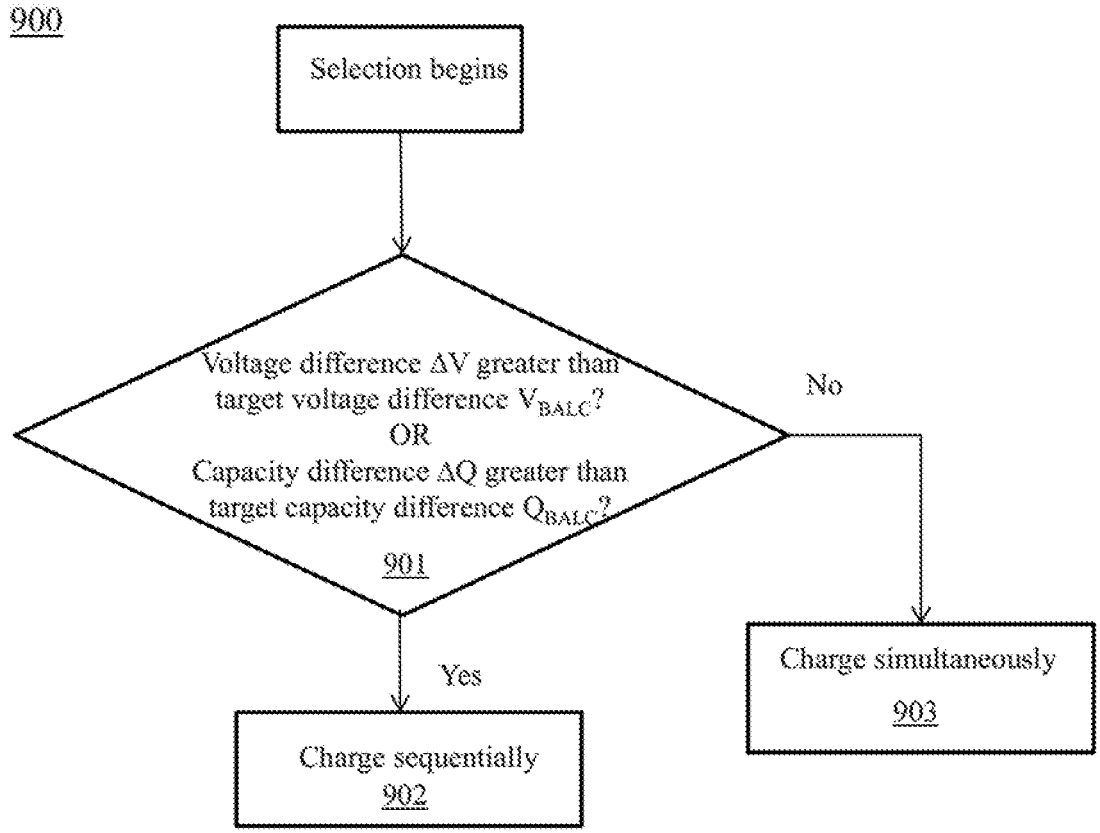
FIG. 16 is an exemplary flow chart illustrating an alternative embodiment of the method of FIG. 15, wherein batteries of the battery assembly are selected for charging.

FIG. 15 is an exemplary top-level flow chart illustrating a method 1200 for balancing the battery assembly 200 in a charging state. In the charging state, the battery assembly 200 can receive power from a power source directly and/or via a charger. A charger can incorporate voltage regulation to control charging voltage applied to the battery assembly

200. Exemplary chargers can include switch mode regulator (or switcher), series regulator, shunt regulator, buck regulator, pulsed charger, USB, and/or charger inductive charging.

The battery assembly 200 can receive power via the battery management system 100. The method 1200 can be implemented by the battery management system 100 (shown in FIG. 1). One or more batteries of the battery assembly 200 are selected, at 1210, based on a status of the batteries 210. Charging of the selected batteries is controlled, at 1220. By charging selected batteries 210, the charging process can balance the battery assembly 200. Additionally and/or alternatively, the status of the battery assembly 200 can be obtained.

In certain embodiments, the battery management system 100 can prioritize charging of the selected batteries 210 to be in an order based on respective voltages and/or capacity of the batteries 210. In some embodiments, the order can include a sequence of charging. FIG. 15 shows an exemplary flow chart of a method 900 for selecting batteries for charging the batteries 210. The method 900 can include a selection process for two batteries. For example, the two batteries can include batteries $210_1$, $210_2$ (shown in FIG. 1).

A voltage difference ΔV between two batteries 210 can be compared, at 901, with the target voltage difference $V_{BALC}$. Additionally and/or alternatively, a capacity difference ΔQ between two batteries 210 can be compared with the target capacity difference $Q_{BALC}$. When at least one of the following conditions is met:

$$\Delta V > V_{BALC}; \text{ and} \qquad \text{Equation (24)}$$

$$\Delta Q > Q_{BALC}, \qquad \text{Equation (25)}$$

the batteries can be charged sequentially, at 902. Stated somewhat differently, the system 100 can charge battery $210_1$ (having a lower voltage/capacity) prior to charging battery $210_2$. In other words, battery $210_1$ can be selected for charging, and battery $210_2$ is not yet selected for charging. When the voltage difference ΔV is not greater than the target voltage difference $V_{BALC}$, and the capacity difference ΔQ is not greater than the target capacity difference $Q_{BALC}$, that is:

$$\Delta V \leq V_{BALC}; \text{ and} \qquad \text{Equation (26)}$$

$$\Delta Q \leq Q_{BALC}, \qquad \text{Equation (27)}$$

the batteries can be charged simultaneously, at 903. Optionally, when Equations (26) and (27) are satisfied for at least some batteries 210, at least some batteries 210 are balanced via charging, and the charging can be stopped.

The method 900 can be implemented on all the batteries 210 to determine the order of charging. Thus, at a given moment, the battery management system 100 can select the batteries 210 to be charged. Stated somewhat differently, based on the method 900, the battery management system 100 can charge batteries 210 having the lowest voltages and/or capacities. When the voltages and/or capacities increase due to the discharging, batteries 210 having the second lowest voltages and/or capacities can join the charging. At the last stage of charging, the batteries 210 of highest voltage and/or capacities can join. Thus, after the charging, voltage and/or capacity difference between at least some of the batteries 210 can be small. The charging can thus balance the batteries 210.

Similarly, method 900 can be implemented similarly for comparing between cells 212 and/or cell groups. The cells 212 and/or cell groups to be compared can be of uniform and/or different batteries 210. Values of the target voltage difference $V_{BALC}$ and/or target capacity difference $Q_{BALC}$ can be adjusted accordingly based on whether comparison is between batteries 210, cells 212, and/or cell groups.

Without selectively charging cells 212 and/or batteries 210, the cells 212 and/or batteries 210 can be charged simultaneously. Weak batteries 210 and/or cells 212 are likely to be over-charged, and tend to exhibit higher voltage than other batteries 210 and/or cells 212 at full charge termination. The higher voltage of weak cells 212 at charge completion can lead to accelerated capacity degradation. Weak cells 212 can be weakened further by continuous overcharge cycles. By using method 900, weak cells 212 and/or batteries 210 can be balanced with other cells 212 and/or batteries 210 at full charge termination. Over-charge damage can be advantageously prevented.

Figure 17:
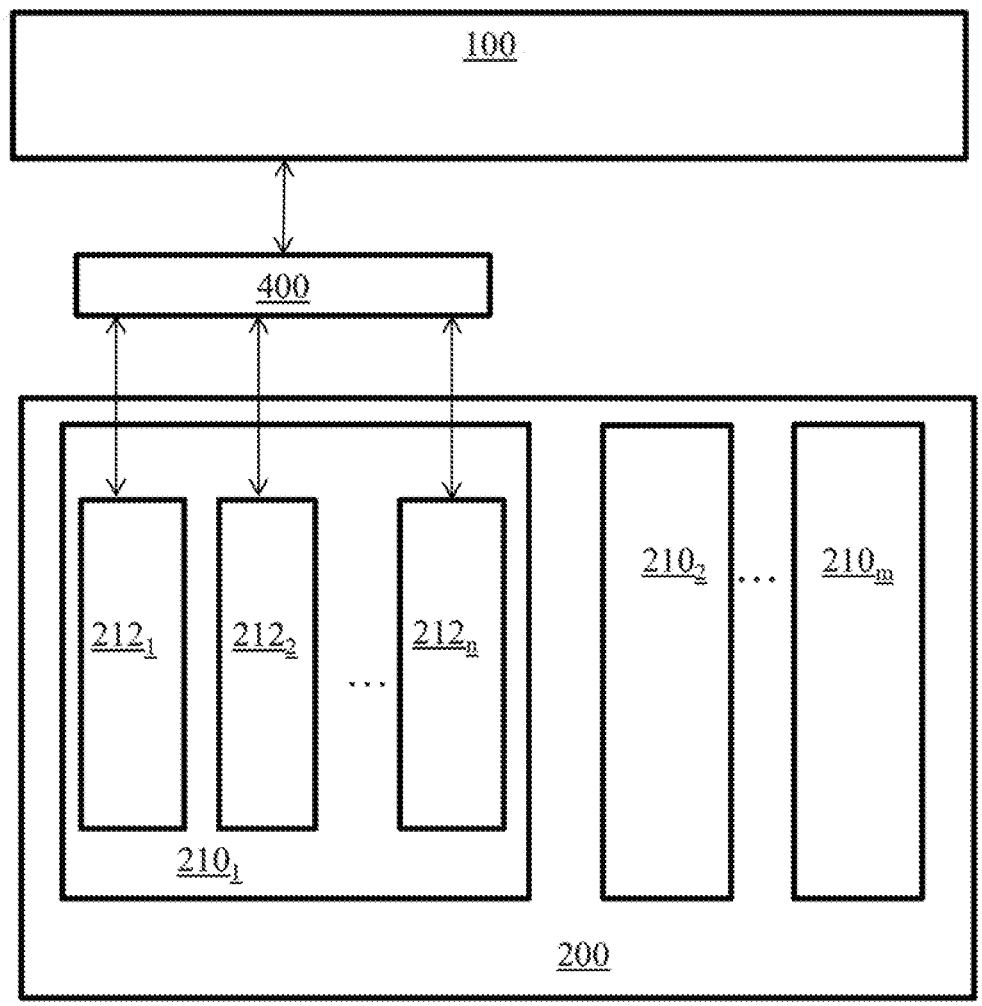
FIG. 17 is an exemplary block diagram illustrating another alternative embodiment of the battery management system of FIG. 1, wherein at least one battery of the battery assembly is coupled to the battery management system via a battery management unit (BMU).

FIG. 17 shows battery $210_1$ as being coupled with a battery management unit (BMU) 400. The BMU 400 can be coupled with one or more cells 212 in the battery 210. In certain embodiments, the BMU 400 can be coupled with each, cell 212 in the battery 210. The battery management system 100 can communicate with the BMU 400 and instruct the BMU 400 to switch to selected cells 212 for active balancing, discharging, and/or charging.

Although FIG. 17 shows one battery 210 as individually coupled with one BMU 400, any number of batteries 210 can be respectively coupled with a uniform and/or different BMU 400. Additionally and/or alternatively, certain batteries can share a common BMU 400. One battery 210 can be coupled with one or more uniform and/or different BMUs 400. In certain embodiments, each battery 210 of the battery assembly 200 can be coupled with a respective BMU 400.

Figure 18:
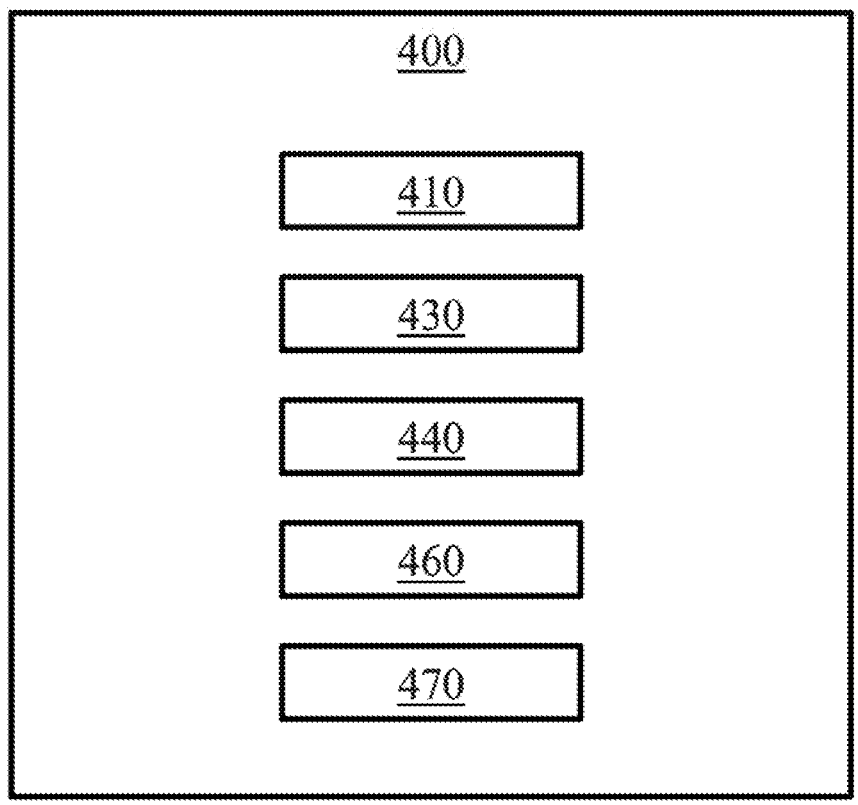
FIG. 18 is an exemplary block diagram illustrating an embodiment of the BMU of FIG. 17.

FIG. 18 shows an exemplary embodiment of the BMU 400. FIG. 18 shows the BMU 400 as including a BMU processor (or microcontroller) 410. The BMU processor 410 can be provided in a similar manner as the control processor 110 (shown in FIG. 3). The BMU 400 can include a memory (not shown) for storing various software programs and/or sets of instructions to be run (or executed) by the BMU processor 410.

The BMU 400 can include one or more cell switch devices 460 for controlling electrical connections to individual cells 212 in response to one or more control signals from the BMU processor 410. The cell switch devices 460 can be provided in a similar manner as the switch devices 160 (shown in FIG. 3). Similar to the coupling between the control processor 110 and the switch devices 160, the BMU processor 410 and the cell switch devices 460 can be coupled directly and/or indirectly via one or more intermediate system components of the 400. Optionally, the BMU processor 410 can be at least partially integrated with one or more of the cell switch devices 460.

The BMU 400 can include a protective circuit 470 for protecting each cell 212 from out-of-tolerance ambient and/or operating conditions. In some embodiments, the protection circuit 470 can control the cell switch devices 460 for isolating a selected cell 212 under undesirable conditions.

Additionally and/or alternatively, the BMU 400 can include a detector 430 for detecting a status of each cell 212. The detector can include one or more sensors (not shown) for sensing status of the cell 212. Additionally and/or alternatively, the 13 BMU 400 can configure connection between cells 212 to be in parallel and/or in series to deliver desired voltage, current, capacity, or power density of the battery 210.

The BMU 400 can be coupled with the battery management system 100 via power connectors, data lines, and/or buses. Additionally and/or alternatively, the BMU 400 can include one or more input/output interfaces 440 to permit data communication and/or electric charge transport between the BMU 400 and the battery management system 100 (shown in FIG. 3).

Although the BMU 400 is shown in FIG. 17 as being separated from the battery management system 100, the BMU 400 can be at least partially integrated with the battery management system 100. For example, the BMU processor 410 can be at least partially integrated with the control processor 110 (shown in FIG. 3). Additionally and/or alternatively, the detector 430 can be at least partially integrated with the detector 130. In other words, the BMU 400 and the battery management system 100 can cooperatively operate as a battery balancing system.

Figure 19:
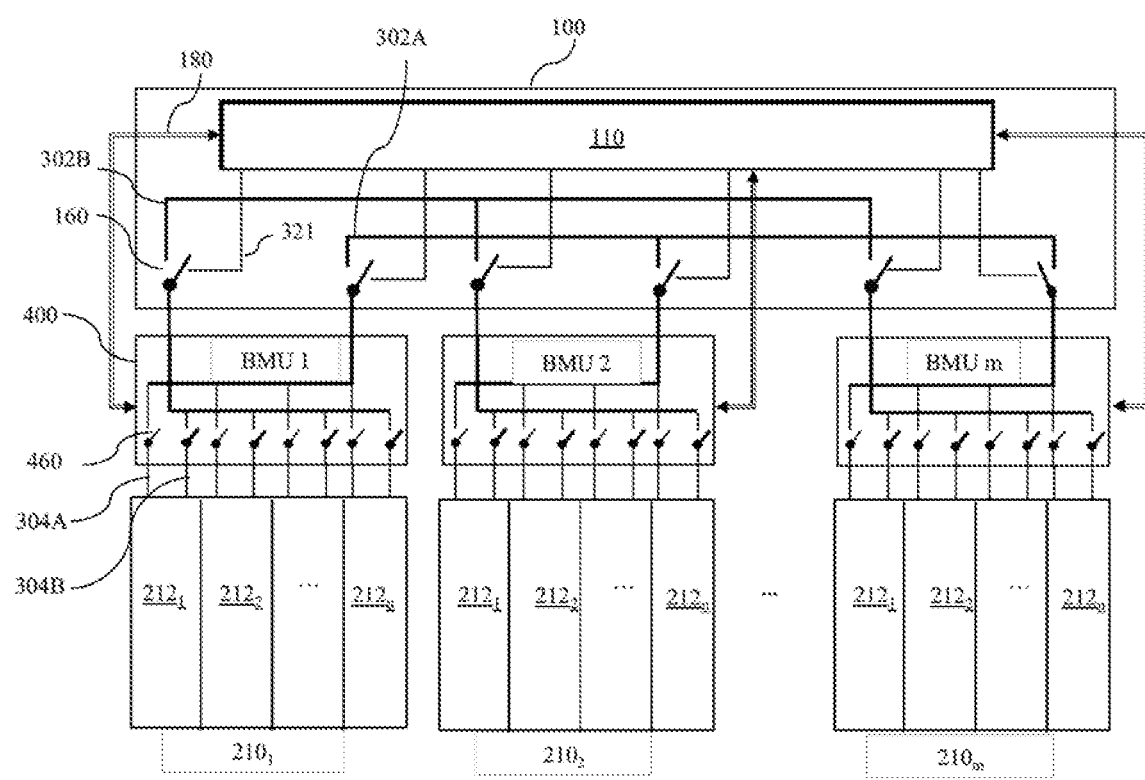
FIG. 19 is exemplary detail diagram illustrating are alternative embodiment of the battery management system of FIG. 1, wherein each battery of the battery assembly is coupled to the battery management system via a respective BMU.

Turning to FIG. 19, each battery 210 is shown as being coupled with a respective BMU 400. Each cell 212 can be electrically connected to other circuit components via cell lines 304A (positive terminal), 304B (negative terminal). The BMU 400 can switch on/off the cell lines 304A, 304B by controlling cell switch devices 460. The cell lines 304A, 304B can transport electric charge into and/or out of a cell. Additionally and/or alternatively, the cell switch devices 460 can be controlled by the protection circuit 470 (shown in FIG. 18) for isolating the cells 212 under undesirable conditions.

FIG. 19 shows the BMUs 400 as being coupled together via battery lines 302A (positive terminal), 302B (negative terminal). The battery lines 302A can be used for transferring electric charge and/or power. The control processor 110 can switch on/off the battery lines 302A, 302B by controlling the switch devices 160. FIG. 19 shows a control line 321 for outputting control signal from the control processor 110. The switch devices 160 can be switched on/off based on the control signal.

As the control processor 110 selects batteries and/or cells for active balancing, discharging, and/or charging, the control processor 110 can select one or more switch devices 160 and/or one or more cell switch devices 460 to be turned on and/or off. Thus, an electrical circuit (such as the balancing path 300 shown in FIG. 5) can be formed for transporting charge between selected batteries and/or cells.

Additionally and/or alternatively, the control processor 110 and each BMU 400 can communicate via a communication line 180. The BMU 400 can send status of the cells 212 to the control processor 110 via the communication line 180. The control processor 110 can send instructions to the BMU processor 410 (shown in FIG. 18) of the BMU 400, so the BMU processor 410 can activate/deactivate selected cell switch devices 460 to switch to a corresponding cell 212 for balancing.

In, certain embodiments, the BMU 400 and/or the control processor 110 do not necessarily selectively activate/deactivate individual cell switch devices 460 corresponding to a battery 210. Thus, the BMU 400 can balance, discharge, and/or charge all the cells 212 of the battery 210, and the control processor 110 can select and/or switch to the battery 210 as a single unit.

Various embodiments further disclose computer program product comprising instructions for balancing the battery assembly 200. The program/software can be stored in a (non-transitory) computer-readable storage medium including, e.g., Read-Only Memory (ROM), Random Access Memory (RAM), internal memory, register, computer hard disk, removable disk, CD-ROM, optical disk, floppy disk, magnetic disk, or the like. The program/software can include coded instructions to instruct one or more processors on a computer device to execute the methods in accordance with various disclosed embodiments.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for balancing a battery assembly comprising a plurality of batteries in a static state, comprising:
    measuring first status parameters of the plurality of batteries, each of the batteries including a plurality of cells, wherein in the static state, the battery assembly does not receive power from a power source and does not provide power to a load;
    selecting a first battery and a second battery from the batteries, the first status parameters of the first battery and the second battery satisfying a first condition;
    measuring second status parameters of the cells of the first battery and the cells of the second battery;
    selecting, according to the second status parameters, one or more first candidate cells from the first battery that are less than the plurality of cells of the first battery, and one or more second candidate cells from the second battery that are less than the plurality of cells of the second battery; and
    controlling active balancing between the one or more first candidate cells and the one or more second candidate cells, to transfer charge between the one or more first candidate cells of the first battery and the one or more second candidate cells of the second battery, wherein the controlling includes:
        controlling a balancing path between the first battery and the second battery to transfer charge between the first battery and the second battery; and
        isolating a particular cell of the one or more first candidate cells and the one or more second candidate cells from the balancing path upon detecting a current through the particular cell being outside a predetermined current range.

2. The method of claim 1, wherein the plurality of cells of each of the batteries are connected in parallel and/or in series.

3. The method of claim 1, further comprising:
    isolating a particular cell of the one or more first candidate cells and the one or more second candidate cells from the balancing path upon detecting a voltage across the particular cell being outside a predetermined voltage range.

4. The method of claim 1, wherein the first status parameters and the second status parameters comprise at least one of a voltage, a capacity, or a current.

5. The method of claim 1, wherein the first condition comprises a difference between respective voltages across the first battery and the second battery being outside a predetermined voltage difference range.

6. The method of claim 5, wherein the first condition comprises the difference between the respective voltages across the first battery and the second battery being greater than a predetermined voltage threshold.

7. The method of claim 1, wherein the first condition comprises a difference between respective capacities of the first battery and the second battery being outside a predetermined capacity difference range.

8. The method of claim 7, wherein the first condition comprises the difference between the respective capacities of the first battery and the second battery being greater than a predetermined capacity threshold.

9. The method of claim 1, wherein the first condition comprises an expected balancing current through the first battery and the second battery being within a predetermined balancing current range.

10. The method of claim 9, wherein the first condition comprises the expected balancing current through the first battery and the second battery being less than a predetermined current threshold.

11. The method of claim 1, wherein the battery assembly is coupled with a battery management unit (BMU), and the controlling comprises controlling the BMU to switch to the first candidate cells and the second candidate cells for balancing.

12. The method of claim 1, wherein the balancing path between the first battery and the second battery comprises a first path connecting positive terminals of the first battery and the second battery and a second path connecting negative terminals of the first battery and the second battery.

13. The method of claim 1, further comprising:
measuring third status parameters of the first battery and the second battery, the third status parameters being different from the first status parameters; and
terminating the active balancing in response to the third status parameters of the first battery and the second battery satisfying a second condition;
wherein:
the first status parameters comprise at least one of a voltage, a capacity, or a current, and
the third status parameters are different from the first status parameters and comprise at least another one of the voltage, the capacity, or the current.

14. A system for balancing a battery assembly comprising a plurality of batteries in a static state, comprising:
one or more processors individually or collectively configured to:
measure first status parameters of the plurality of batteries, each of the batteries including a plurality of cells, wherein in the static state, the battery assembly does not receive power from a power source and does not provide power to a load;
select a first battery and a second battery from the batteries; the first status parameters of the first battery and the second battery satisfying a first condition;
measure second status parameters of the cells of the first battery and the cells of the second battery;
select, according to the second status parameters, one or more first candidate cells from the first battery that are less that the plurality of cells of the first battery, and one or more second candidate cells from the second battery that are less than the plurality of cells of the second battery; and
control active balancing between the one or more first candidate cells and the one or more second candidate cells, to transfer charge between the one or more first candidate cells of the first battery and the one or more second candidate cells of the second battery wherein the one or more processors further configured to:
control a balancing path between the first battery and the second battery to transfer charge between the first battery and the second battery; and
isolate a particular cell of the one or more first candidate cells and the one or more second candidate cells from the balancing path upon detecting a current through the particular cell being outside a predetermined current range.

15. The system of claim 14, wherein the first condition comprises an expected balancing current through the first battery and the second battery being within a predetermined balancing current range.

16. The system of claim 15, wherein the first condition comprises the expected balancing current through the first battery and the second battery being less than a predetermined current threshold.

17. An apparatus for battery balancing in a static state, comprising:
a battery assembly comprising a plurality of batteries, each of the batteries including a plurality of cells, wherein in the static state, the battery assembly does not receive power from a power source and does not provide power to a load; and
a system coupled with the batteries and comprising one or more processors individually or collectively configured to:
measure first status parameters of the plurality of batteries;
select a first battery and a second battery from the batteries, the first status parameters of the first battery and the second battery satisfying a first condition;
measure second status parameters of the cells of the first battery and the cells of the second battery;
select, according to the second status parameters, one or more first candidate cells from the first battery that are less than the plurality of cells of the first battery, and one or more second candidate cells from the second battery that are less than the plurality of cells of the second battery; and
control active balancing between the one or more first candidate cells and the one or more second candidate cells, to transfer charge between the one or more first candidate cells of the first battery and the one or more second candidate cells of the second battery, wherein the one or more processors further configured to:
control a balancing path between the first battery and the second battery to transfer charge between the first battery and the second battery; and
isolate a particular cell of the one or more first candidate cells and the one or more second candidate cells from the balancing path upon detecting a current through the particular cell being outside a predetermined current range.

* * * * *